US012659983B2

(12) United States Patent (10) Patent No.: US 12,659,983 B2

Orhan et al. (45) Date of Patent: Jun. 16, 2026

---

(54) METHODS AND DEVICES FOR RADIO RESOURCE SCHEDULING IN RADIO ACCESS NETWORKS

(71) Applicant: Intel Corporation, Santa Clara, CA (US)

(72) Inventors: Oner Orhan, San Jose, CA (US); Hosein Nikopour, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/876,571

(22) Filed: Jul. 29, 2022

(65) Prior Publication Data

US 2024/0049272 A1 Feb. 8, 2024

(51) Int. Cl.
H04W 72/542 (2023.01)
G06N 3/04 (2023.01)
H04W 72/566 (2023.01)

(52) U.S. Cl.
CPC ............ H04W 72/542 (2023.01); G06N 3/04 (2013.01); H04W 72/566 (2023.01)

(58) Field of Classification Search
None
See application file for complete search history.

(56) References Cited

U.S. PATENT DOCUMENTS 10,503,174 B1 * 12/2019 Kim ..................... G01S 13/931
2020/0074988 A1 * 3/2020 Park ...................... G06N 3/045

2020/0076746 A1 * 3/2020 Penrose ................ H04L 51/224
2021/0377114 A1 * 12/2021 Nelson .................. H04L 41/142
2023/0342590 A1 * 10/2023 O'Shea ................ G06N 3/0464

OTHER PUBLICATIONS

Ranasinghe et al. "Graph Neural Network Based Access Point Selection for Cell-Free Massive MIMO Systems" (Year: 2021).*
Guo et al. "A Novel User Selection Massive MIMO Scheduling Algorithm via Real Time DDPG" (Year: 2020).*
Guo, Xiaojun et al., "A Novel User Selection Massive MIMO Scheduling Algorithm via Real Time DDPG", IEEE, Dec. 7-11, 2020, 6 pages, GLOBECOM 2020—2020 IEEE Global Communications Conference, Taipei, Taiwan.
U.S. Appl. No. 17/551,257, non-published, filed Dec. 15, 2021.

* cited by examiner

*Primary Examiner* — Gregory B Sefcheck
*Assistant Examiner* — Benjamin Peter Welte
(74) *Attorney, Agent, or Firm* — Viering, Jentschura & Partner mbB

(57) ABSTRACT

A device may include a processor configured to provide input data that is based on channel information representative of attributes associated with one or more established communication channels of a plurality of communication devices to a trained machine learning model configured to determine a score for each of the plurality of communication devices based on the input data, wherein the score represents a likelihood of the respective communication device to be scheduled for a communication resource to perform a communication, determine, for the communication resource, one or more communication devices from the plurality of communication devices based on the determined score for each of the plurality of communication devices, and provide an output to schedule the communication resource for the one or more communication devices.

20 Claims, 10 Drawing Sheets

710

711

712

801     802     803     804

700

811              812

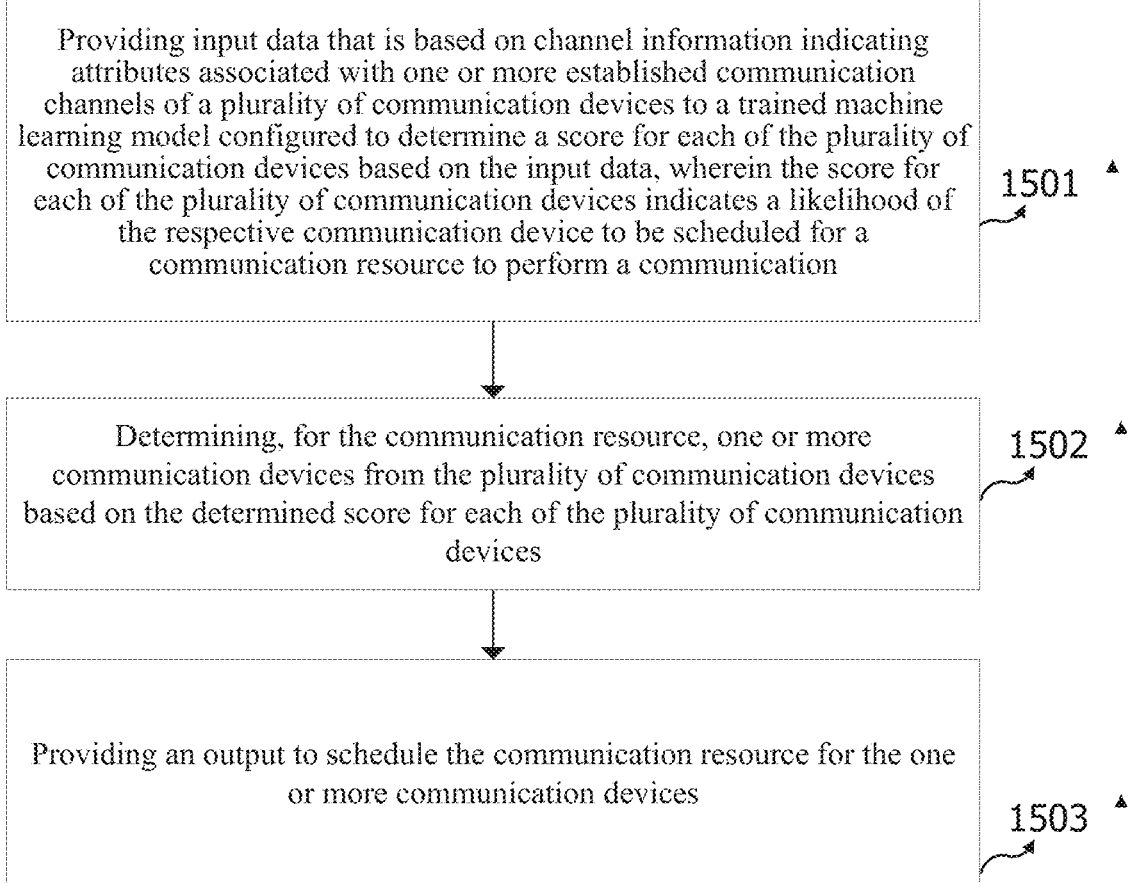

Providing input data that is based on channel information indicating attributes associated with one or more established communication channels of a plurality of communication devices to a trained machine learning model configured to determine a score for each of the plurality of communication devices based on the input data, wherein the score for each of the plurality of communication devices indicates a likelihood of the respective communication device to be scheduled for a communication resource to perform a communication     1501

Determining, for the communication resource, one or more communication devices from the plurality of communication devices based on the determined score for each of the plurality of communication devices     1502

Providing an output to schedule the communication resource for the one or more communication devices     1503

FIG. 15

METHODS AND DEVICES FOR RADIO RESOURCE SCHEDULING IN RADIO ACCESS NETWORKS

TECHNICAL FIELD

This disclosure generally relates to methods and devices for scheduling communication resources for communication devices.

BACKGROUND

In various wireless radio communication technologies, there are various techniques that are applied to schedule time and frequency resources for communication purposes. In consideration of the increased demand for data rate and the number of communication devices connected to the wireless communication network, scheduling limited communication resources may have certain challenges in terms of complexity, scalability, and performance. Next generation wireless networks may still be able to operate efficiently on general-purpose processors. Furthermore, the introduction and wide adoption of technologies allowing multipath wireless communication, such as multi-user MIMO systems, may introduce further complexity, scalability, and/or performance challenges to methods and algorithms used to schedule communication resources to multiple communication devices. It may be desirable to schedule communication resources for multiple communication devices using methods that are cost-effective and that may provide flexible management of wireless access networks.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which:

FIG. 15 shows an example of a method.

DESCRIPTION

Figure 1:
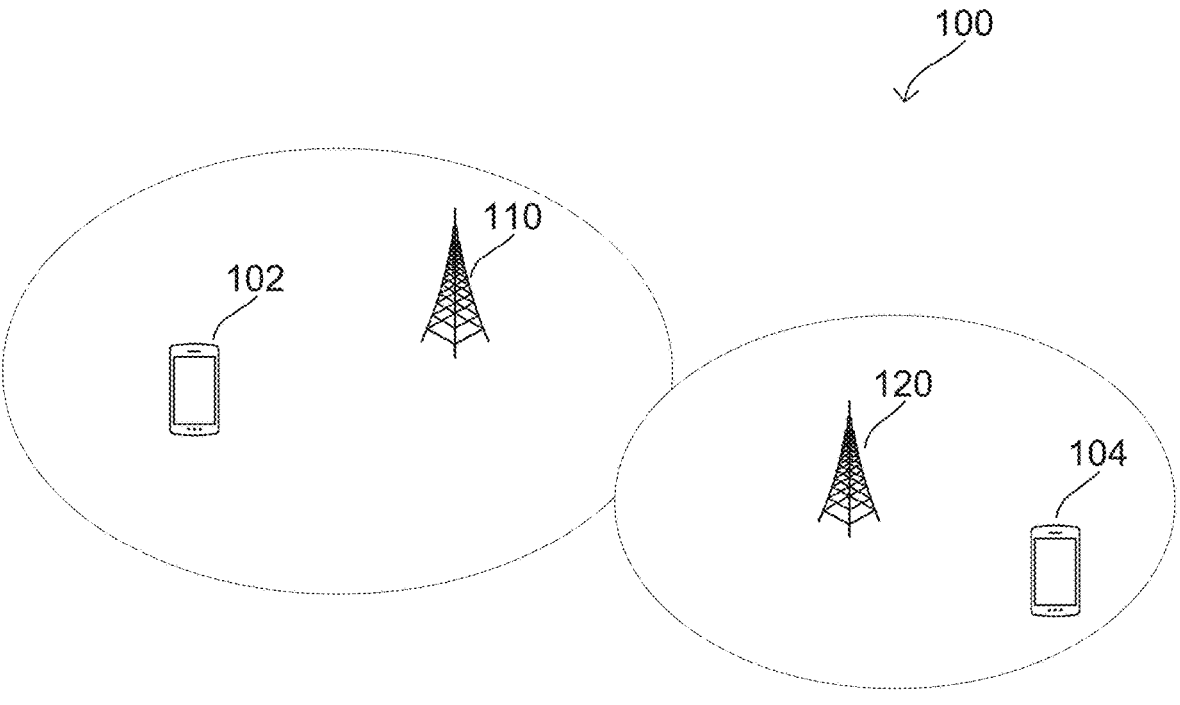
FIG. 1 shows exemplary radio communication network.

The following detailed description refers to the accompanying drawings that show, by way of illustration, exemplary details and aspects in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one.

Any vector and/or matrix notation utilized herein is exemplary in nature and is employed solely for purposes of explanation. Accordingly, the apparatuses and methods of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc. The notations used in the disclosure refers to each other and used in compliance within the disclosure.

As used herein, "memory" is understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory, and thus may refer to a collective component including one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

In the context of this disclosure, the term "process" may be used, for example, to indicate a method. Illustratively, any process described herein may be implemented as a method (e.g., a channel estimation process may be understood as a channel estimation method). Any process described herein may be implemented as a non-transitory computer-readable medium including instructions configured, when executed, to cause one or more processors to carry out the process (e.g., to carry out the method).

In cellular communication, a base station (BS) may allocate and schedule communication resources (time and frequency resources) for UEs served by the BS. The BS may determine UE(s) that can use a designated communication resource based on various types of information, such as channel information representing various attributes associated with a communication channel that is established between the UE and the BS, various attributes of the respective UE, amount of data to be transmitted by the UE, average data rate over the established communication channel, a priority parameter indicating a weight associated with the UE, QoS requirements associated to the UE, and such. The BS may determine, based on such information for all UEs, that are served by the BS or that request communication resources, one or more UEs that are allowed to use the designated communication resource. The present disclosure provides methods and devices that are configured to allocate and schedule communication resources for communication devices.

In various examples, allocation and scheduling of communication resources may be based on channel information indicating or representing attributes associated with one or more established communication channels of a plurality of communication devices. It may further be based on further information such as measurements associated with communication devices or the network, reports (e.g. buffer status report, BSR) received from communication devices, that may indicate or represent the amount of data in one or more buffers of respective communication devices, quality of service (QoS) requirements associated for communication devices, radio bearers associated for communication devices, and/or requests received communication devices (e.g. scheduling request, SR), that may indicate or represent a request of one or more communication resources.

In accordance with various aspects of this disclosure, the allocation and scheduling of communication resources may include using artificial intelligence/machine learning (AI/ML) models. The AI/ML model be configured to output indicating or representing one or more UEs that are allocated for one or more communication resources based on input including at least the channel information. The input may further include the further information as provided herein. Once the one or more UEs are allocated for one or more communication resources, methods and devices disclosed herein may provide one or more outputs to schedule the one or more UEs to use the allocated one or more communication resources.

In accordance with various aspects of this disclosure, the AI/ML may include a graph neural network (GNN) that provides an output based on a graph representing the input. The graph may include nodes (vertices) representing a communication channel-related attribute of communication devices (e.g. MIMO layer) and edges representing a relation associated with the represented communication channel-related attributes of the communication devices. The term node has been used in this disclosure as a synonym for the term vertex. In accordance with various aspects, GNN may be a multi-relational GNN. The multi-relational GNN may use a number of edge weight sets (i.e. edge sets) that are associated with a number of relations. The relations used by the multi-relational GNN may include at least two of the following: user fairness among the communication devices, cross-interference between the communication devices, and/or an obtained likelihoods of respective communication devices to be scheduled within a communication resource.

In various examples, the GNN may include a graph attention network (GAT) configured to apply attention (e.g. attention weight) parameters indicative or representative of assigned importance between nodes. In various examples, the determined score for each communication device may include the attention score associated for the communication device. In various examples, the GAT may be a multi-headed graph attention network (MH-GAT) for multiple attention weight sets, wherein each set of at least two sets is associated with at least one of the following: user fairness among the communication devices, cross-interference between the communication devices, and/or an obtained likelihoods of respective communication devices to be scheduled within a communication resource. In various examples, the GAT may obtain combined attention parameters for different attention layers, where each attention layer is set for a sub-band of the communication resource to be scheduled.

The apparatuses and methods of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the apparatuses and methods described herein may utilize include, but are not limited to: a Global System for Mobile Communications ("GSM") radio communication technology, a General Packet Radio Service ("GPRS") radio communication technology, an Enhanced Data Rates for GSM Evolution ("EDGE") radio communication technology, and/or a Third Generation Partnership Project ("3GPP") radio communication technology, for example Universal Mobile Telecommunications System ("UMTS"), Freedom of Multimedia Access ("FOMA"), 3GPP Long Term Evolution ("LTE"), 3GPP Long Term Evolution Advanced ("LTE Advanced"), Code division multiple access 2000 ("CDMA2000"), Cellular Digital Packet Data ("CDPD"), Mobitex, Third Generation (3G), Circuit Switched Data ("CSD"), High-Speed Circuit-Switched Data ("HSCSD"), Universal Mobile Telecommunications System ("Third Generation") ("UMTS (3G)"), Wideband Code Division Multiple Access (Universal Mobile Telecommunications System) ("W-CDMA (UMTS)"), High Speed Packet Access ("HSPA"), High-Speed Downlink Packet Access ("HSDPA"), High-Speed Uplink Packet Access ("HSUPA"), High Speed Packet Access Plus ("HSPA+"), Universal Mobile Telecommunications System-Time-Division Duplex ("UMTS-TDD"), Time Division-Code Division Multiple Access ("TD-CDMA"), Time Division-Synchronous Code Division Multiple Access ("TD-CDMA"), 3rd Generation Partnership Project Release 8 (Pre-4th Generation) ("3GPP Rel. 8 (Pre-4G)"), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access ("LAA"), MuLTEfire, UMTS Terrestrial Radio Access ("UTRA"), Evolved UMTS Terrestrial Radio Access ("E-UTRA"), Long Term Evolution Advanced (4th Generation) ("LTE Advanced (4G)"), cdmaOne ("2G"), Code division multiple access 2000 (Third generation) ("CDMA2000 (3G)"), Evolution-Data Optimized or Evolution-Data Only ("EV-DO"), Advanced Mobile Phone System (1st Generation) ("AMPS (1G)"), Total Access Communication arrangement/Extended Total Access Communication arrangement ("TACS/ETACS"), Digital AMPS (2nd Generation) ("D-AMPS (2G)"), Push-to-talk ("PTT"), Mobile Telephone System ("MTS"), Improved Mobile Telephone System ("WITS"), Advanced Mobile Telephone System ("AMTS"), OLT (Norwegian for Offentlig Landmobil Telefoni, Public Land Mobile Telephony), MTD (Swedish abbreviation for Mobiltelefonisystem D, or Mobile telephony system D), Public Automated Land Mobile ("Autotel/PALM"), ARP (Finnish for Autoradiopuhelin, "car radio phone"), NMT (Nordic Mobile Telephony), High capacity version of NTT (Nippon Telegraph and Telephone) ("Hicap"), Cellular Digital Packet Data ("CDPD"), Mobitex, DataTAC, Integrated Digital Enhanced Network ("iDEN"), Personal Digital Cellular ("PDC"), Circuit Switched Data ("CSD"), Personal Handy-phone System ("PHS"), Wideband Integrated Digital Enhanced Network ("WiDEN"), iBurst, Unlicensed Mobile Access ("UMA"), also referred to as also referred to as 3GPP Generic Access Network, or GAN standard), Zigbee, Bluetooth®, Wireless Gigabit Alliance ("WiGig") standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle ("V2V") and Vehicle-to-X ("V2X") and Vehicle-to-Infrastructure ("V2I") and Infrastructure-to-Vehicle ("I2V") communication technologies, 3GPP cellular V2X, DSRC (Dedicated Short Range Communications) communication arrangements such as Intelligent-Transport-Systems, and other existing, developing, or future radio communication technologies.

The apparatuses and methods described herein may use such radio communication technologies according to various spectrum management schemes, including, but not limited to, dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies), and may use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the apparatuses and methods described herein can also employ radio communication technologies on a secondary basis on bands such as the TV White Space bands (typically below 790 MHz) where e.g. the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, the apparatuses and methods described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. The apparatuses and methods described herein can also use radio communication technologies with different Single Carrier or OFDM flavors (CP-OFDM, SC-FDMA, SC-OFDM, filter bank-based multicarrier (FBMC), OFDMA, etc.) and e.g. 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications ("GSM"), Code Division Multiple Access 2000 ("CDMA2000"), Universal Mobile Telecommunications System ("UMTS"), Long Term Evolution ("LTE"), General Packet Radio Service ("GPRS"), Evolution-Data Optimized ("EV-DO"), Enhanced Data Rates for GSM Evolution ("EDGE"), High Speed Packet Access (HSPA; including High Speed Downlink Packet Access ("HSDPA"), High Speed Uplink Packet Access ("HSUPA"), HSDPA Plus ("HSDPA+"), and HSUPA Plus ("HSUPA+")), Worldwide Interoperability for Microwave Access ("WiMax") (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations. The term "channel state information" is used herein to refer generally to the wireless channel for a wireless transmission between one or more transmitting antennas and one or more receiving antennas and may take into account any factors that affect a wireless transmission such as, but not limited to, path loss, interference, and/or blockage.

Figure 2:
FIG. 2 shows an exemplary internal configuration of a communication device.
Figure 2:
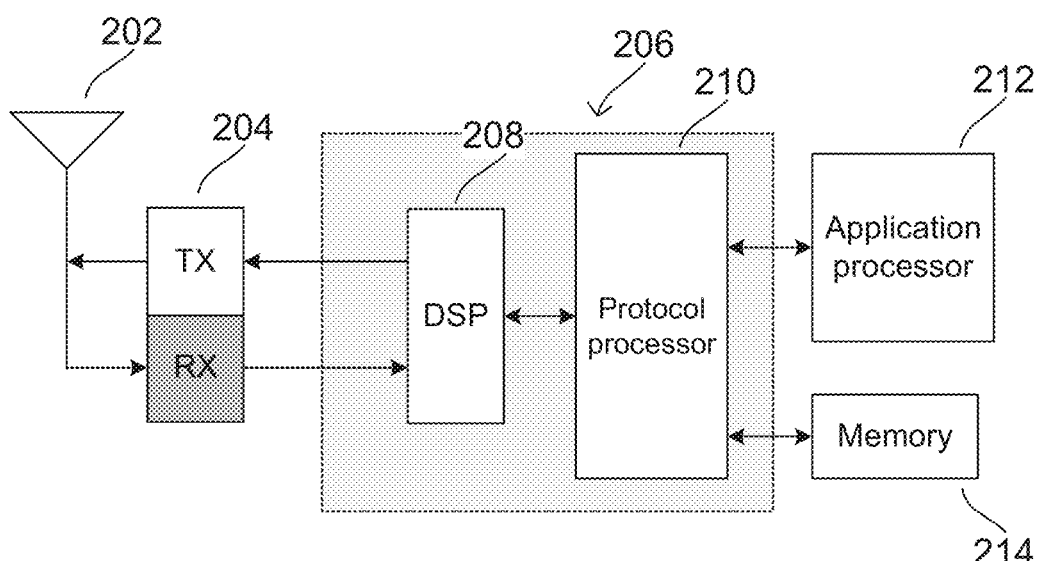

FIGS. 1 and 2 depict a general network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks. Network access nodes 110 and 120 and terminal devices 102 and 104 may include one or multiple transmission/reception points (TRPs).

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an exemplary internal configuration of a communication device according to various aspects provided in this disclosure. In accordance to various aspects provided herein, one of the network access nodes 110 and 120 or one of the terminal devices 102 and 104 may include the communication device 200. The communication device 200 may include antenna system 202, radio frequency (RF) transceiver 204, baseband modem 206 (including digital signal processor 208 and protocol controller 210), application processor 212, and memory 214. Although not explicitly shown in FIG. 2, in some aspects communication device 200 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Communication device 200 may transmit and receive radio signals on one or more radio access networks. Baseband modem 206 may direct such communication functionality of communication device 200 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of communication device 200 shown in FIG. 2 depicts only a single instance of such components.

Communication device 200 may transmit and receive wireless signals with antenna system 202. Antenna system 202 may be a single antenna or may include one or more antenna arrays that each include multiple antenna elements. For example, antenna system 202 may include an antenna array at the top of communication device 200 and a second antenna array at the bottom of communication device 200. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Communication device 200 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of communication device 200 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of communication device 200 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio communication device 200 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Communication device 200 may also include application processor 212 and memory 214. Application processor 212 may be a CPU, and may be configured to handle the layers above the protocol stack, including the transport and application layers. Application processor 212 may be configured to execute various applications and/or programs of communication device 200 at an application layer of communication device 200, such as an operating system (OS), a user interface (UI) for supporting user interaction with communication device 200, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface. In various examples, the application processor 212 or the protocol controller 210 may perform operations associated with scheduling as defined herein.

Memory 214 may embody a memory component of communication device 200, such as a hard drive or another such permanent memory device. Although not explicitly depicted in FIG. 2, the various other components of communication device 200 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select \ available network access nodes in order to maintain a strong radio access connection with the radio access network of radio communication network 100. For example, terminal device 102 may establish a radio access connection with network access node 110 while terminal device 104 may establish a radio access connection with network access node 112. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112.

Furthermore, network access nodes 110 and 112 may be configured to allocate time and frequency resources to communicate with terminal devices 102 and 104 within their allocated resources. In various examples, once network access nodes 110 and 102 allocates communication resources, network access nodes 110 and 112 configure terminal devices 102 and 104 to communicate with network access nodes 110 and 112 using their respective allocated communication resources by sending a message. The configuration may include a configuration of a rate allocation or a selection of a modulation coding scheme (MCS) to be used by the respective terminal devices 102 and 104 within their respective allocated communication resources.

Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 3:
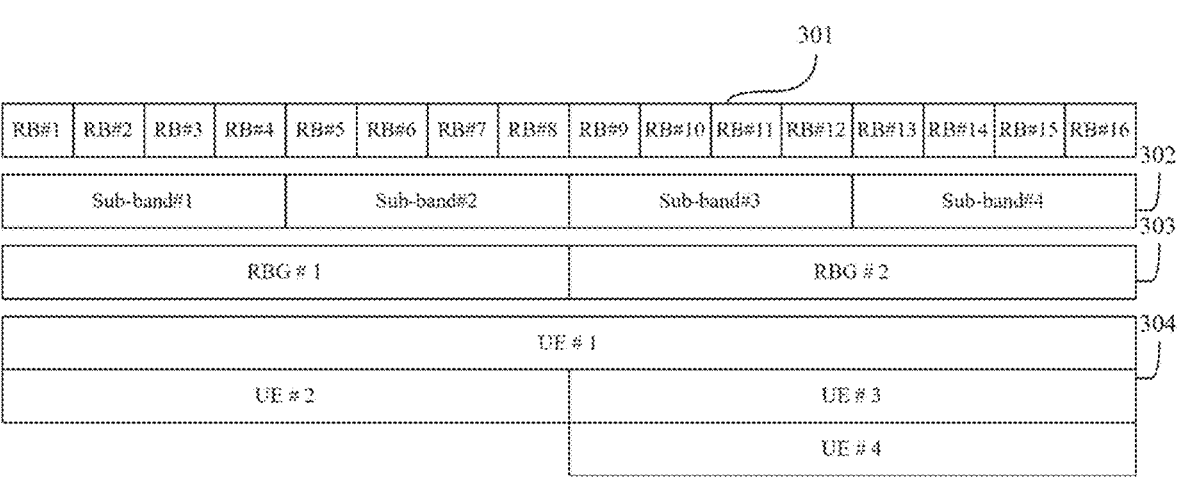
FIG. 3 shows an example illustrating communication resources in cellular communication technologies and their allocations.

FIG. 3 shows an example illustrating communication resources in cellular communication technologies and their allocations. Aspects provided in accordance with FIG. 3 may include aspects relating to communication resources and their allocation in 5G NR. The skilled person may apply the teaching provided herein to further communication technologies that may operate with communication resources (i.e. time resources and/or frequency resources) that may be structured in a manner that is different from 5G NR and allocation of differently structured communication resources.

According to the resource grid defined for 5G NR, the smallest unit may be a resource element corresponding to a frequency resource of a subcarrier in the frequency domain and to a time resource of one orthogonal frequency-division multiplexing (OFDM) symbol in the time domain. Furthermore, the communication resources may include a resource block 301 corresponding to a plurality of resource elements. A resource block 301 is defined as 12 consecutive subcarriers in the frequency domain within 5G NR, of which the duration at the time domain can be at minimum one OFDM symbol and can be configured. Furthermore, the communication resources may include a resource block group 303 corresponding to a plurality of resource blocks 301. A resource block group 303 can be defined a plurality of consecutive resource blocks 301 in 5G NR, and the number of resource blocks 301 in a resource block group 303 may vary depending on various factors, including allocation type, bandwidth part (BWP) size, and further parameters. Furthermore, each resource block group may be associated with one or more sub-bands 302. Sub-bands illustrated herein may include a sub-band including designated subcarriers of a resource block 301 or designated subcarriers of a plurality of resource blocks 302 that is configured to operate with different subcarriers. Herein, the resource block group #1 is illustrated as it includes resource blocks 1 to 8 associated with sub-band #1 and sub-band #2, and the resource block group #2 is illustrated as it includes resource blocks 9 to 16 associated with sub-band #3 and sub-band #4.

In response to an allocation (or scheduling) operation performed by an entity (e.g. an allocator or a scheduler) within the wireless communication network, the entity may determine one or more communication devices (e.g. UEs) that can use one or more communication resources. The scheduling entity can allocate communication resources differently. In this illustrative example, the scheduling has made the determination for a communication resource that is a resource block group, in which the resource block group has been allocated to one or more communication devices. The scheduling entity may be configured to allocate communication resources in subframes, frames, etc. Accordingly, RGB #1 has been allocated for UE #1 and UE #2, and RGB #2 has been allocated for UE #1, UE #3, and UE #4. Furthermore, the scheduling entity may encode scheduling messages to the corresponding UEs indicating their allocated communication resources (e.g. RGBs) respectively.

In accordance with various aspects provided herein, devices may include or may be, in particular, a base station (BS) or a component of a BS in a distributed BS (e.g. a Distributed Unit (DU) or a Central Unit (CU, centralized unit or control unit)), a controller within the communication network such as an intelligent controller (a RAN intelligent controller (RIC, such as a near-real time (RT) RIC, or a non-RT RIC), a network access node, an access point, or another entity or a network function that is configured to allocate communication resources for communication resources. The present disclosure may include aspects that may be provided from the perspective of a BS for brevity, but the skilled person may implement these aspects to any one of the entities provided herein.

Figure 4:
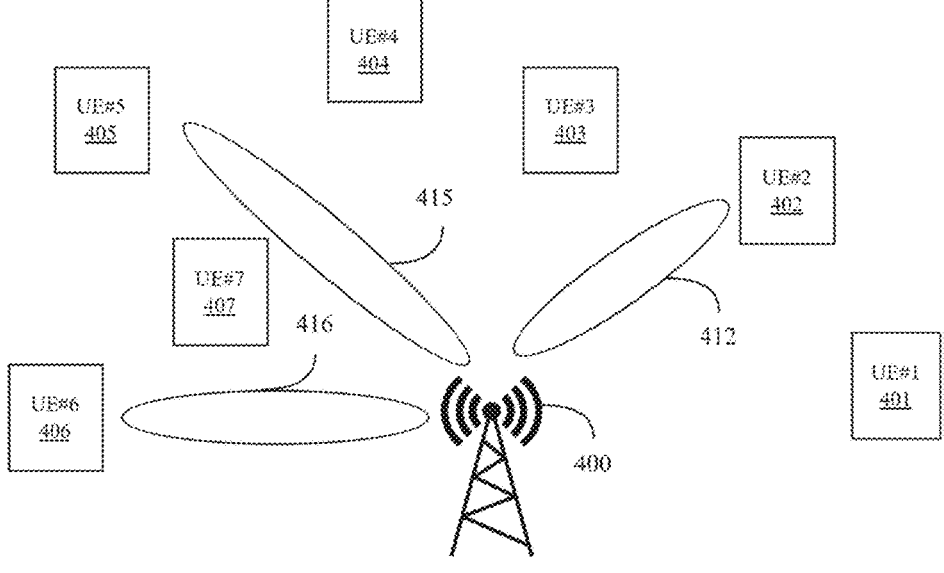
FIG. 4 shows an exemplary network architecture.

FIG. 4 shows an exemplary network architecture. The network architecture is depicted as a radio access network supporting the MU-MIMO technology. The network includes a BS 400 and a plurality of UEs 401, 402, 403, 404, 405, 406, 407 that are communicatively coupled to (and served by) the BS 400. The network may include further UEs and further BSs that are not shown in this illustration. The BS 400 may include an evolved node B (eNB) or a next generation node B (gNB). In various examples, the BS 400 may have a distributed (or split) architecture, such as a baseband unit (BBU) and a centralized unit (CU, or a control unit), or a radio unit (RU), a distributed unit (DU) and a centralized unit (CU, or a control unit) according to an open radio access network (O-RAN) structure, and in a distributed RAN architecture, any one of the entities associated with the BS may perform various operations disclosed herein. In such a distributed architecture, entities associated with the BS may perform various operations disclosed herein in a distributed manner, such as one of the entities (e.g. RU) may receive information, one of the entities (e.g. CU) may perform determination, and one of the entities (e.g. DU) may perform scheduling. In various aspects another entity within a network (e.g. a near-real time radio access network intelligent controller, near-RT RIC, and/or a non-real time RIC), that may allocate communication resources and schedule (of which the communication may be through a BS).

The BS 400 may be configured to receive the channel information and the further information to be used to allocate communication resources for the UEs 401, 402, 403, 404, 405, 406, 407. In this illustrative example, the BS 400 may have allocated the present communication resources in a manner that the BS 400 transmits a first beam 412 to the UE #2 402, a second beam 415 to the UE #5 405, and a third beam 416 to the UE #6 406 with the allocated resources to perform downlink (DL) transmissions to the respective UEs.

Although it is now shown in the illustrative example, a UE may be configured to receive radio communication signals at different MIMO layers. In other words, a UE may be configured to receive multiple data streams that are transmitted on the same communication (time and frequency) resources via different beams (i.e. radio communication signals transmitted with different beam directions). The BS 400 may be configured to transmit more than one data stream to each one of one or more UEs (e.g. UE #2 402, UE #5 405, UE #6 406 in the illustrative example) on the same communication resource. For example, in 5G NR, the BS 400 may configure each UE with respect to a number of MIMO layers (data streams) to be used and antenna port configuration via demodulation reference signal (DMRS)-related RRC parameters, such as dmrs-Type and maxLength, and downlink control information (DCI) indicating antenna ports and the number of layers. A UE may send a message including a request of a number of MIMO layers (e.g. a rank indicator, RI), which the UE may determine based on measurements performed at the UE.

Figure 5:
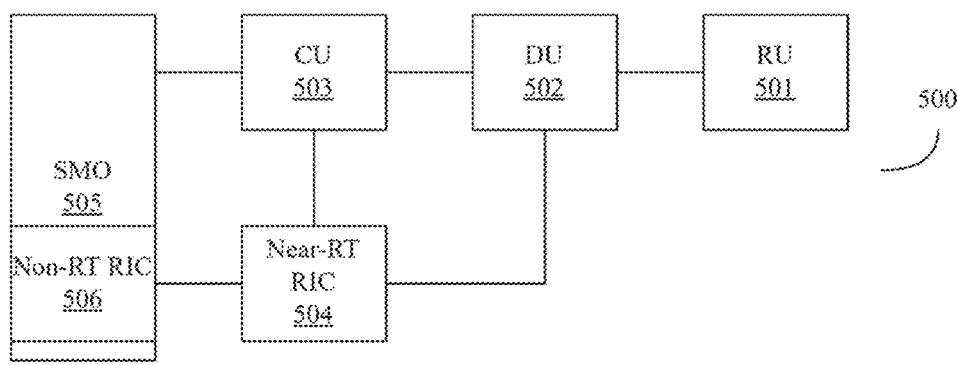
FIG. 5 shows an exemplary radio access network architecture in which the radio access network is disaggregated in multiple units.

FIG. 5 shows an exemplary radio access network architecture in which the radio access network is disaggregated in multiple units. In LTE or 5G NR, network access nodes, such as a BS may implement the whole network stack including physical layer (PHY), media access control (MAC), radio link control (RLC), packet data convergence control (PDCP), and radio resource control (RRC) functions of the network stack. In a distributed approach of radio access networks, the processing of the network stack is disaggregated into at least two units. Although the example illustrates a distributed structure that is based on open-RAN (O-RAN) architecture, the skilled person may populate the teaching provided herein in other types of distributed architectures, such as baseband unit (BBU) that may operate in the cloud and may be split to a Control Unit (CU) according to Rel.15 of 3GPP standards.

In various deployments in recently emerged RAN architectures, such as Open Radio Access Network (O-RAN) architectures, network access nodes may have functionalities that are split among multiple units with an intention to meet the demands of increased capacity requirements by providing a flexible and interoperable approach for RANs. The exemplary RAN 500 provided herein includes a radio unit (RU) 501, a distributed unit (DU) 502, a central unit (CU) 503, a near-RT RAN intelligent controller (near RT-RIC) 504, and a service management and orchestration framework (SMO) 505 including a non-RT RIC 506.

There are many approaches to provide the split among the multiple units. In this illustrative example, the CU 503 (e.g. O-CU) may be mainly responsible for non-real time operations hosting the radio resource control (RRC), the PDCP protocol, and the service data adaptation protocol (SDAP). The DU (e.g. O-DU) 502 may be mainly responsible for real-time operations hosting, for example, RLC layer functions, MAC layer functions, and Higher-PHY functions. RUs 501 (e.g. O-RU) may be mainly responsible for hosting the Lower-PHY functions to transmit and receive radio communication signals to/from terminal devices (e.g. UEs) and provide data streams to the DU over a fronthaul interface (e.g. open fronthaul). The SMO 505 may provide functions to manage domains such as RAN management, Core management, Transport management, and the non-RT RIC 506 may provide functions to support intelligent RAN optimization via policy-based guidance, AI/ML model management, etc. The near-RT RIC 504 may provide functions for real time optimizations, including hosting one or more xApps that may collect real-time information (per UE or per Cell) and provide services, that may include AI/ML services as well.

The exemplary RAN 500 is illustrated for the purpose of brevity. The skilled person would recognize the aspects provided herein and may also realize that the exemplary RAN 500 may include further characterizations, such as the CU may also be—at least logically—distributed into two entities (e.g. CU-Control Plane, CU-User Plane), there may be various types of interfaces between different entities of the exemplary RAN 500 (e.g. E2, F1, O1, X2, NG-u, etc.).

In accordance with the exemplary distributed RAN architecture, a UE may transmit radio communication signals to the RU 501 and receive radio communication signals from the RU 501. The processing associated with the communication is performed at the respective layers of the network stack by respective entities that are responsible to perform corresponding functions of the respective layers. In accordance with various aspects of this disclosure and this exemplary RAN 500, aspects associated with the allocation of communication resources may be performed by MAC layer functions within the DU 502. However, this should not be interpreted as limiting, as various aspects of this disclosure also include aspects related to the determination of UEs for a communication resource to be scheduled, which may also be performed in CU 503, or in RICs 504, 506 (e.g. near-RT RIC 504). In consideration of functions provided by a near-RT RIC, the entity that provides the near-RT RIC functions may be configured to determine one or more UEs that are allowed to communicate using one or more designated communication resources, and provide an output to the DU 502 (or to the CU 503) via an interface (e.g. an E2 interface) to schedule the one or more designated communication resources for the one or more UEs. In response to a received instruction, the DU 502 may perform MAC operations to schedule the one or more designated communication resources for the one or more UEs.

Next generation wireless networks are expected to run efficiently on general purpose processors to enable virtual RAN. This brings cost-effective and flexible management of wireless access networks. However, as the demand for data rate and the number of devices increases over time, the traditional methods considering small-scale optimal or even heuristic greedy solutions suffer from high complexity/latency or significant performance loss. Therefore, it may be desirable to use scalable, intelligent, and low-complexity algorithms to allocate and schedule resources for communication devices. One emerging problem for next generation wireless networks is user scheduling for multi-user massive MIMO systems. Greedy scheduling algorithms may include methods, in order to determine the combination of communication devices to be allocated in a communication source, calculations are performed one at a time, by first selecting a first communication device, and then selecting further communication devices to be scheduled with the first communication device to make a group, resulting the use of at least two loops for calculations associated with the combination per a communication resource. In these algorithms, users are picked one at a time to make a group based on weighted sum rate in each transmission time interval (TTI). The best user is picked first, followed by the second-best user that makes the best 'pair' with the already first user, and so on. Therefore, it may be desirable to decrease the complexity and latency associated with the calculations and provide a method that scales with a large number of communication devices. Various techniques provided here may include using an AI/ML based solution for massive MIMO base stations for user scheduling in MAC layer with an intention to decrease the complexity. Such techniques may include user scheduling with one-shot (single inference). Techniques may include using graphs, GNNs, multi-relational GNNs, and/or multi-head graph attention neural network (WI-GAT).

Various aspects provided herein may include using channel information to allocate and/or schedule communication resources for communication devices. In various examples, the channel information may include channel state information (CSI) to find the best combination of communication devices at a given transmission time. In various examples, the combination may include a combination per resource block group (RBG). The CSI may include, for each communication device, information associated with the established communication channel of the communication device, a signal-to-noise ratio (SNR) of the communication device, channel rank of the communication device, a precoding matrix, and a communication device proportional fairness weight. Various aspects of this disclosure may include computing inter-user interference (beam correlation) using a precoding matrix and using the calculated beam correlation matrix as well as the CSI as input features of the AI/ML. Various aspects may include modeling three GNNs with edge weights of beam correlation, user weights, and user selection score. Various aspects may include providing each MIMO layer of a user as a vertex in a graph. In various aspects, edge weights may provide multiplicative scaling to input features (such as CSI) of communication devices to find a good combination of communication devices for scheduling.

A CSI report received from a communication device (UE) may include CSI information including various components associated with the communication channel. Such components may be a channel quality information (CQI), a precoding matrix indicator (PMI), a CSI-RS resource indicator (CRI), a synchronization signal block physical broadcast channel resource indicator (SSBRI), a layer indicator (LI), a rank indicator (RI), and/or a layer-1 reference signal received power (L1-RSRP), depending on the report type based on the configuration of CSI framework at higher layers.

Various aspects provided in this disclosure include a determination of communication devices that are allowed to communicate with a network access node (e.g. a BS, a RU, etc.) using one or more communication resources. A device may perform the determination and allocate the one or more communication resources to the respective communication devices. Within this context, the term "schedule" includes the allocation of communication resources among communication devices via assigning uplink or downlink resources. In association with aspects provided herein, the examples may be provided using terminology including scheduling that also includes allocation, and they may be provided for downlink resources, but this should not be taken as limiting. The skilled person would recognize that aspects also cover scheduling or allocations made for uplink resources as well.

In accordance with various aspects provided herein, a determination of one or more communication devices for one or more communication resources may be based on the channel information. The channel information may include any information that may represent or indicate attributes associated with one or more established communication channels. For example, the channel information may include information indicative of, or representative of, at least one of: a CSI, a quality metric of a communication channel (e.g. channel quality indicator, CQI), an indication of MIMO layers (e.g. rank indicator, RI), a correlation matrix representing interference between communication devices (e.g. a beam correlation matrix), beamforming weights applied by a communication device (e.g. a precoding matrix information (or indicator), PMI), an SNR or an SINR associated with the communication channel, or measurements performed for the communication channel. The measurements may have been performed by the UE or by the BS.

In accordance with various aspects provided herein, the channel information may be per sub-band. Accordingly, at least some of the information that is provided in the previous paragraph may include a plurality of sub-band information and each sub-band information may be information associated with a subband. For example, the channel information of a communication device may include a plurality of CSI (of a plurality of sub-bands), wherein each CSI includes information associated with a particular sub-band, or the PMI may be provided as a single user (SU)-MIMO-PMI for each sub-band for the plurality of sub-bands. In various aspects, at least one of the information that is provided in the previous paragraph may include information associated with a plurality of MIMO layers. For example, a CQI may be provided for each MIMO layer for each sub-band.

In various aspects, the determination of one or more communication devices may be based on, in addition to the channel information, device information indicating or representing attributes associated with a communication device. The device information may include, for a communication device, at least one of: information representing a predefined or predetermined priority (e.g. a user weight) of the respective communication device, maximum transmit power of the communication device, an average data rate (e.g. average taken for a predefined time period) of the communication device, information associated with further measurements of the communication device (e.g. distance to the BS, location, etc.), buffer status indicating or representing an amount of data in one or more buffers of the communication device (e.g. BSR), quality of service (QoS) requirements associated for the communication device, radio bearers associated for the communication device, and/or information related to requests received from the communication device for communication resources (e.g. SR).

Figure 6:
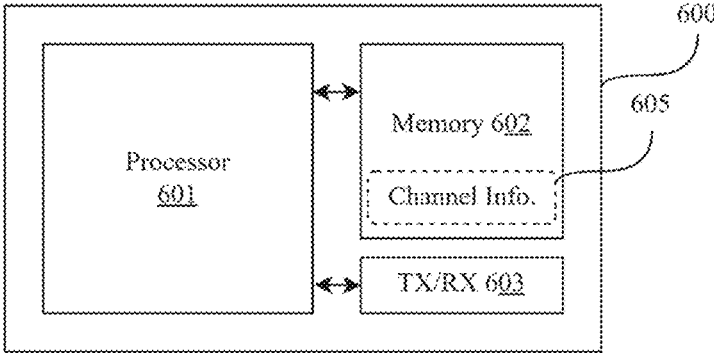
FIG. 6 shows an example of a device.

FIG. 6 shows an example of a device 600 according to various examples in this disclosure. The device 600 is depicted as a communication device in this illustrative example, including a processor 601, a memory 602, and a transceiver 603. Various aspects of the device 600 are explained with an example that the device 600 is a device of a BS for brevity without explicitly disclosing features that may be characteristics of another entity in the radio access network that may include the device 600. Accordingly, the skilled person would recognize for implementation of the device 600 in another entity, that the device 600 may be communicatively coupled to a BS or to a component of a BS to obtain the information required to perform some of the operations and provide output as disclosed herein (e.g. channel information, device information, output to schedule communication devices) from a BS or a device of a BS.

The device 600 may be a radio communication device configured to receive and transmit radio communication signals using an antenna element and accordingly the transceiver 603 may include a plurality of antenna ports couplable to a plurality of antenna elements (e.g. an antenna array) to support beamforming and/or spatial multiplexing to communicate with the plurality of communication devices (UEs) served by the device 600.

The processor 601 may include one or more processors which may include a baseband processor and an application processor. In various examples, the processor 601 may include a central processing unit, a graphics processing unit, a hardware acceleration unit, a neuromorphic chip, and/or a controller. The processor 601 may be implemented in one processing unit, e.g. a system on chip (SOC), or a processor. In accordance with various examples, the processor 601 may further provide further functions to process received radio communication signals. The memory 602 may store various types of information required for the processor 601, or the transceiver 603 to operate in accordance with various aspects of this disclosure.

The memory 602 may be configured to store channel information 605 of the plurality of communication devices. The channel information 605 may include information representing various attributes associated or related to an established communication channel of a radio communication device, as disclosed herein. The memory 602 may be further configured to store device information of at least some of the plurality communication devices, as disclosed herein. The device 600 may obtain the channel information 605 and the device information of the plurality of communication devices via the transceiver 603 and store them in the memory 602. In various examples, the device 600 may receive the channel information 605 from the UEs served by the device 600. In various examples that the device 600 is a device of another entity in RAN (e.g. a RIC), the device 600 may receive the channel information and the device information of the UEs that are served from a further entity (e.g. a RU, a DU, etc.) of the RAN.

In order to allocate communication resources to be used by one or more communication devices from the plurality of communication devices that are served by the device 600, the processor 601 may determine one or more communication devices that are allowed to communicate by using a communication resource. The determination may include selecting one or more communication devices from the plurality of communication devices that are connected to the device 600 (e.g. in RRC Connected mode). Based on the determination of the one or more communication devices that are allowed to perform communications by using a communication resource, the device 600 may schedule communications (e.g. downlink transmissions) to be made using the communication resource. In various examples, the device 600 may schedule communications (e.g. uplink transmissions) to be made by the one or more communication devices with the communication resource by encoding messages to be transmitted to the one or more communication devices indicating the scheduled communication resource. In various examples, the device 600 may perform rate allocation and a selection of modulation and coding schemes for the one or more communication devices based on the determination.

Various aspects herein may utilize one or more artificial learning/machine learning models (AI/ML) to determine the one or more communication devices that may perform communication using a communication resource in accordance with various aspects of this disclosure. The term "model" used herein may be understood as any kind of algorithm, which provides output data based on input data provided to the model (e.g., any kind of algorithm generating or calculating output data based on input data).

The device 600 may implement the AI/ML. The processor 601, or another processor as provided in this disclosure may implement the AI/ML. According to various aspects of this disclosure, other types of AI/ML implementations may include a further processor that may be internal or external to the processor (e.g. an accelerator, a graphics processing unit (GPU), a neuromorphic chip, etc.), or a memory may also implement the AI/ML. Furthermore, the device 600 may also access and use an external AI/ML that another computing device may implement (e.g. an edge computing device or a cloud computing device) according to various aspects of this disclosure. The AI/ML may be configured to provide output data based on input data and AI/ML parameters. The AI/ML may include a trained AI/ML, in which the AI/ML parameters are configured according to a training process for the purpose of determination of the one or more communication device that may use a communication resource based on received input data that is based on at least the channel information or based on the channel information 605 and the device information. A trained AI/ML may include an AI/ML which is trained prior to an inference to obtain output data. A trained AI/ML may further include an AI/ML which is trained based on the output data obtained via AI/ML (i.e. optimizations). In various aspects, AI/ML parameters include parameters configured to control how input data is transformed into output data. AI/ML parameters may further include hyperparameters configured to control how the AI/ML performs learning (e.g. learning rate, number of layers, etc.).

The processor 601 may be configured to determine a score for each of the plurality of communication devices based on the channel information 605 indicating attributes associated with established communication channels between the device 600 and the plurality of communication devices using the AI/ML. Each determined score may indicate or represent a likelihood of the respective communication device to be scheduled for a designated communication resource. The communication resource may be a resource block or a resource block group, or any other time and frequency resources to be used for communication. Based on the determined scores for each of the plurality of communication devices, the processor 601 may determine one or more communication devices to communicate using the designated communication resource.

The processor 601 may determine a sub-band score for each of the plurality of communication devices based on sub-band channel information including a portion of the channel information that is associated with a sub-band. Furthermore, the processor 601 may determine a score (e.g. attention score, attention weight), that is indicative of the likelihood of the respective communication device to be scheduled for the communication resource, for each of the plurality of communication devices based on a plurality of determined sub-band scores for the respective communication device. Additionally, or alternatively, a score may indicate, or represent, an influence associated to the respective communication device in relation with the communication resource.

The processor 601 may determine a score (or a sub-band score) for each of the plurality of communication devices that is further based on at least one further parameter associated with relations and/or effects between the communication devices. The at least one parameter may include a parameter that is indicative of, or representative of, at least one of: cross-interference between the respective communication device and other communication devices of the plurality of communication devices; user fairness based on a predefined or predetermined priority associated with the respective communication device (e.g. indicative of whether the device has a priority or a weight over other communication devices); and/or sub-band association of the respective communication device that may indicate or represent a likelihood of the respective communication device to be scheduled for one of the sub-bands associated with the communication resource.

Figure 7:
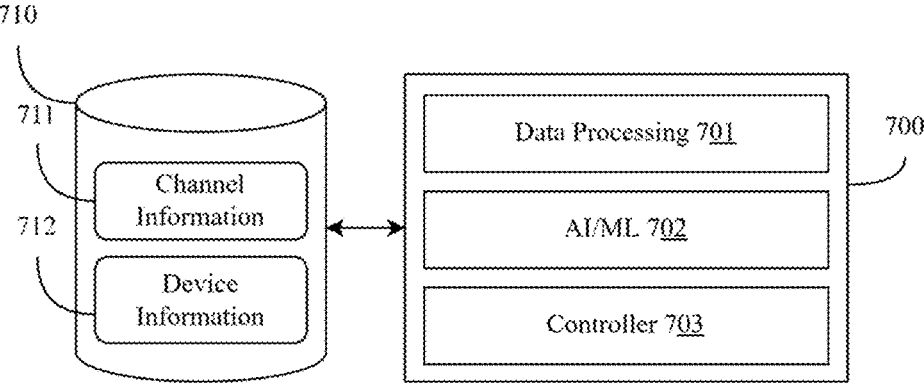
FIG. 7 shows an example of a processor and a memory of a device.

FIG. 7 shows an example of a processor and a memory of a device according to various aspects provided in this disclosure. The processor 700 is depicted to include various functional units that are configured to provide various functions as disclosed herein, associated with a processor (e.g.

the processor 601) that may be used within a device (e.g. the device 600). The skilled person would recognize that the depicted functional units are provided to explain various operations that the processor 700 may be configured to perform. Similarly, the memory 710 is depicted to include the channel information 711 and the device information 712 as blocks, however, the memory may store the channel information 711 and the device information 712 in any kind of suitable configuration or mechanism. Furthermore, the AI/ML unit 702 is depicted as it is implemented in the processor 700 only as an example, and any type of AI/ML implementation which may include the implementation of the AI/ML in an external processor, such as an accelerator, a graphics processing unit (GPU), a neuromorphic chip, or in a cloud computing device, or in an external communication device may also be possible according to any methods.

The processor 700 may include a data processing module 701 that is configured to process the data and obtain at least a portion of the channel information 711 and/or the device information 712 as provided in various examples in this disclosure (e.g. via measurements, via reception) to be stored in the memory 710. In various examples, the channel information 711 and the device information 712 may include information for operations that the device has performed in the past for at least within a period of time in a plurality of instances of time (e.g. as a time-series data). The data processing module 701 may obtain a portion of the channel information 711 and the device information 712 according to the operations of the device. For example, the channel information 711 may include at least one CSI (e.g. the latest CSI).

As an example, the data processing module 701 may obtain the channel information 711 and the device information 712 from received data packets from the plurality of communication devices. Furthermore, the data processing module 701 may access information directly for a portion of device information 712 that is already stored in the memory 710. For example, the memory 710 may include already the location associated information related to UEs (e.g. location, velocity, mobility, etc.) for other operations, or CSI reports so the data processing module 701 may not obtain the same information to regard that particular information as the device information 712. The data processing module 701 may obtain the information to be used as the device information 712 based on exchanged messages between the device and UEs.

The AI/ML unit 702 may implement an AI/ML. The AI/ML may be configured to receive input data with certain constraints, features, and formats. Accordingly, the data processing module 701 may obtain input data, that is based on the channel information 711 and the device information 712, to be provided to the AI/ML to obtain output of the AI/ML. In various examples, the data processing module 701 may provide input data including input data items that include, or that are based on, the channel information 711 and the device information 712 to the AI/ML. In various examples, the data processing module 701 may convert the channel information 711 and the device information 712 to an input format suitable for the AI/ML (e.g. input feature vectors) so that the AI/ML may process the channel information 711 and the device information 712.

In accordance with various aspects provided herein, the input data may include a graph that is based on at least the channel information 711. The data processing module 701 may obtain the graph based on, or including, the channel information.

A graph, in particular within the context of AI/ML, includes a collection of objects (i.e. nodes, vertices) and information associated with a set of interactions (edges) between pairs of these objects. A graph G=(V,E) can be defined by a set of nodes (vertices), V, and a set of edges E between the nodes. In other words, a graph may be defined with a first set of data items including information of each node, and a second set of data items including information representing how nodes are related.

In order to represent a graph with data items, an adjacency matrix A may be used to indicate or represent the presence of edges between the nodes in a manner that every node indexes a particular row and column in the adjacency matrix. In such example, a value of the adjacency matrix A associated with nodes (u,v), where u and v denote a first node and a second node, may be denoted with 1 if an edge is present between the first node u and the second node v, or the value of the adjacency matrix A associated with nodes (u,v) becomes 0 if an edge is not present between the nodes. In various aspects, an adjacency matrix may include a weighted adjacency matrix to represent weighted edges of the graph. A weighted edge may represent a relation between nodes that is not binary. A weighted adjacency matrix may include, or may be denoted with, an adjacency matrix representing the presence of edges between nodes and a weight matrix representing the degree of the relation or interaction (i.e. strength of association) between the nodes.

Accordingly, the data processing module 701 may obtain the graph based on the channel information 711 and the device information 712. The data processing module 701 may generate the graph to be provided as input data to the AI/ML based on the channel information and the device information to obtain the graph. The obtained graph may include nodes that are associated with each communication device of the plurality of communication devices. The data processing module 701 may obtain a plurality of graphs for a plurality of sub-bands to be occupied by the communication resource to be scheduled as the input data, in which each graph may be obtained based on a portion of the channel information 711 (and/or the device information 712) that is associated with the respective sub-band. Accordingly, the data processing module 701 may select the portions of the channel information 711 that are associated with the sub-bands of the communication resource, based on the properties of the communication resource to be scheduled. In accordance with various aspects, a graph may include nodes, wherein each node may represent a MIMO layer of one of the plurality of communication devices.

Accordingly, each node may include, or may be associated with, input features that are based on portions of the channel information 711 and the device information 712 that are associated with the respective MIMO layer of the respective communication device from the plurality of communication devices. In combination with a graph associated with a sub-band of the plurality of sub-bands, each node may be associated, or may include, input features that are based on the channel information 711 and the device information 712 for one MIMO layer of one of the communication devices at a designated sub-band. In order to reduce complexity and avoid using an update function, the graph may include a self-edge for each node pairing the node with itself.

Furthermore, the AI/ML configured to process the graph may be configured to perform a relation prediction. Accordingly, a graph may include a node associated with the communication resource. In particular, for a graph of a sub-band, the graph may include a node for the respective sub-band. The node may be initialized with a input feature vector [0 0 . . . 0]. Accordingly, the data processing module 701 may generate the graph of a sub-band, such that the graph includes a node (e.g. a virtual node) for the respective sub-band.

Furthermore, the data processing module 701 may obtain the graph based on the channel information 711 and the device information 712, such that the graph includes a plurality of edges (i.e. edge weights) for a plurality of relations. The plurality of relations may include a relation that is indicative of, or representative of, cross-interference between the nodes (e.g. MIMO layers of the plurality of communication devices). The plurality of relations may include a relation that is indicative of, or representative of, user fairness based on a predefined or predetermined priority associated with the nodes, or the respective communication devices of the nodes (e.g. indicative of whether the device has a priority or a weight over other communication devices). The plurality of relations may include a relation that is indicative of, or representative of, the likelihood of association of the node, or the respective communication device of the nodes. Accordingly, the data processing module 701 may obtain the plurality of edges of the graph based on the channel information 711 and the device information 712 via calculations or estimations.

The relation associated with the cross-interference may be based on estimated cross-interference between each MIMO layer of the plurality of communication devices. With respect to the relation associated with the cross-interference, the data processing module 701 may obtain a first set of edges representing the relation associated with the cross-interference based on the channel information 711.

For example, the channel information 711 may include SINR information and the precoding matrix of each communication device, and the data processing module 701 may obtain the first set of edges based on the SINR information and the precoding matrix of the respective communication devices of the respective nodes. Self-edges of each of the nodes of the first set of edges may be equal to zero. Furthermore, edges that are associated with the node of the communication resource (e.g. respective sub-band for the graph of a sub-band) may also be equal to zero.

The relation associated with user fairness may be based on user weights assigned for the plurality of communication devices, wherein each user weight may represent a priority associated with a communication device among the plurality of communication devices. With respect to the relation associated with the user fairness, the data processing module 701 may obtain a second set of edges representing the relation associated with the user fairness based on the device information 712.

For example, the device information 712 may include predefined user weights associated with each communication device, and the data processing module 701 may obtain the second set of edges based on the predefined user weights of the respective communication devices of the respective nodes. In various examples, the second set of edges may include the same edge weight for all nodes of the same communication device. Each self-edge of a node may be a value that is based on the user weight of the communication device associated with the respective node. Edges linking the relation between the node of the communication resource (e.g. respective sub-band for the graph of a sub-band) and nodes associated with the plurality of communication devices may also be the value that is based on the user weight of the respective communication device associated with the respective node. Edges between the other nodes of the communication devices (edges between two communication devices) may be equal to zero.

In accordance with various aspects of this disclosure, the likelihood of allocation and/or the likelihood of a communication device to be scheduled for a communication resource may be represented with an attention metric by using an attention mechanism, in particular for examples associated with GNNs. The attention metric may represent the importance of neighbor nodes for a node, wherein the neighbor nodes may be defined as other nodes having edges with the node. Accordingly, with respect to the relation that is indicative of, or representative of, the likelihood of allocation of the node, or the respective communication device of the nodes, the data processing module 701 may obtain a third set of edges representing the relation of the likelihood of the allocation associated for the respective node.

For example, the data processing module 701 may obtain the third set of edges based on the predefined user weights of the respective communication devices for the respective nodes. Each self-edge of a node may be a value that is based on the user weight of the communication device associated with the respective node, similar to the second set of edges. Furthermore, edges linking the relation between the node of the communication resource (e.g. respective sub-band for the graph of a sub-band) and nodes associated with the plurality of communication devices may be set to 1 (or to another value that indicates the presence of edges), as the input data assigns the same importance for the plurality of communication devices.

Figure 8:
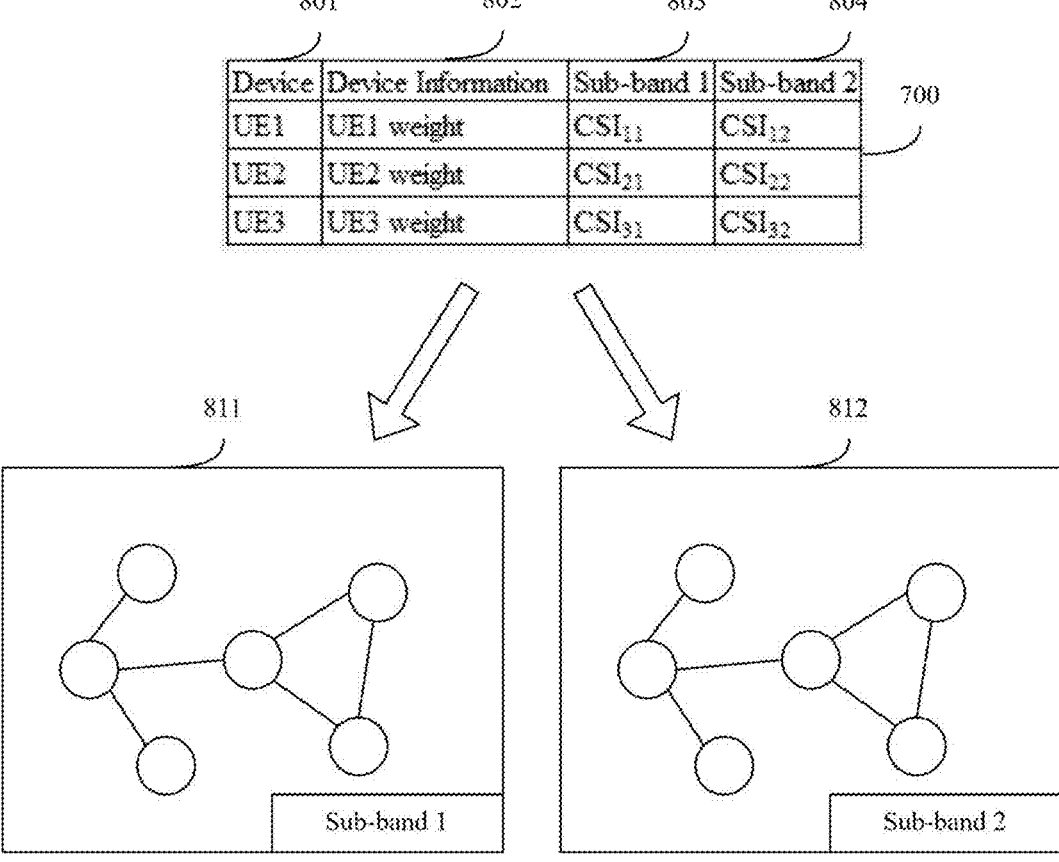
FIG. 8 shows an exemplary illustration related to channel information, device information, and a representation of input data.

FIG. 8 shows an exemplary illustration related to channel information, device information, and a representation of input data. A memory (e.g. the memory 710) may include device information 802 and channel information 803, 804 for each communication device 801 of the plurality of communication devices, in accordance with various aspects provided herein. As seen from this illustrative example, the channel information 803 for each communication device 801 may include channel information of a first sub-band 803 representing attributes associated with an established communication channel between a UE and BS at the first sub-band, and channel information of a second sub-band 804 representing attributes associated with established communication channel between a UE and BS at the second sub-band. The communication resource to be scheduled may include the first sub-band and the second sub-band. Each CSI may include information representing a number of MIMO layers (e.g. RI), a precoding matrix (e.g. PMI or SU-MIMO beamforming matrix obtained at the device (e.g. the device 600) using sounding reference signal (SRS)), a CQI, etc.

A data processing module (e.g. the data processing module 701) may obtain a first graph 811 for the first sub-band based on the channel information of the first sub-band (i.e. $CSI_{11}$, $CSI_{21}$, $CSI_{31}$) 803 and a second graph 802 for the second sub-band based on the channel information of the second sub-band (i.e. $CSI_{12}$, $CSI_{22}$, $CSI_{32}$) 804. For example, each node of the first graph may be associated with a MIMO layer of a UE and include input features based on channel information of the first sub-band 803 for the respective UE (e.g. channel rank of the respective UE, SINR measurement at the respective MIMO layer, SINR measurement for the transport block, precoding matrix, CQI, etc.). Similarly, each node of the second graph may be associated with a MIMO layer of a UE and include input features based on channel information of the second sub-band 804 for the respective UE.

In a graph including a node per MIMO layer of each communication device 801, the channel information may include at least one information that is characteristic for a MIMO layer associated to a communication device (e.g. results of measurements performed per MIMO layer, such as SINR measurements at each MIMO layers). The data processing module may populate other input features associated with the node, that may not be characteristic of the MIMO layer, but that may be characteristic of the respective communication device. The data processing module may accordingly populate other input features that are characteristic of the communication device to all nodes that are associated with all MIMO layers of the respective communication device. In various examples, the graph may include a self-edge coupling a node with the node itself to reduce complexity and to avoid further processing iteration with an update function.

An obtained graph may include a node for each MIMO layer of the communication devices 801. Each graph may further include a further node associated with the respective sub-band (e.g. a sub-band node). The data processing module may assign predefined input features for the respective sub-band (e.g. an input zero vector). In various aspects, each graph may include more than one set of edges, wherein each set of edges may be associated with a relation of the communication devices (i.e. effects associated with an attribute related to radio communication between communication devices), such as cross-interference, predefined user weights, a likelihood of allocation, etc. An AI/ML may receive the graphs as the input data to determine a score for each of the communication devices 801.

Furthermore, such a graph may also include edges coupling the sub-band node with each MIMO layer of the communication devices 801. Accordingly, the data processing module may assign predefined edge values for the edges coupling the sub-band node with each MIMO layer of the communication devices 801. In various examples, predefined edge values for the edges coupling the sub-band node may include information indicating, or representing, the presence of the respective edges.

In various examples, predefined edge values for the edges coupling the sub-band node may be based on the device information 802 and may include user fairness parameters (e.g. UE weights) associated with each communication device, as provided in this disclosure. In various examples, predefined edge values for the edges coupling the sub-band node may include attention parameters associated with each communication device. Each edge value coupling the sub-band node with a node associated with multiple nodes of one of the communication devices 801, which each node of the multiple nodes is associated with the MIMO layer of the respective node, may have the same edge value.

In various examples, an obtained graph may include a node for each MIMO layer of the communication devices 801 for the respective sub-band and edges may couple each MIMO layer of one of the communication devices 801 to another node associated with another MIMO layer of all communication devices 801 including the respective communication device as well. The data processing module may assign edge values of edges coupling the nodes associated with MIMO layers based on an interaction between the respective MIMO layers. In various examples, the data processing module may assign information indicating, or representing, the presence of the respective edges for edge values of the edges coupling the nodes associated with MIMO layers. In various examples, the interaction may be cross-interference between the respective MIMO layers.

Accordingly, the graph may include edges coupling the nodes associated with MIMO layers, which indicate, or represent, cross-interference between the respective MIMO layers. In various examples, the data processing module may calculate the cross-interference for each edge coupling the nodes associated with the respective MIMO layers, based on the channel information (e.g. precoding matrix indicator, SINR measurements, etc.) and assign edge weights representing the calculated cross-interference for a respective edge.

In various aspects, the data processing module may obtain an adjacency matrix to indicate, or to represent, the edges. In various aspects, each graph may include a plurality of edges (such examples provided herein), and the data processing module may obtain a plurality of adjacency matrices, wherein each adjacency matrix indicates, or represents, one set of weights. An obtained adjacency matrix may represent whether an edge is present or node for respective nodes, or an obtained adjacency matrix may be a weighted adjacency matrix, as provided herein.

Figure 9:
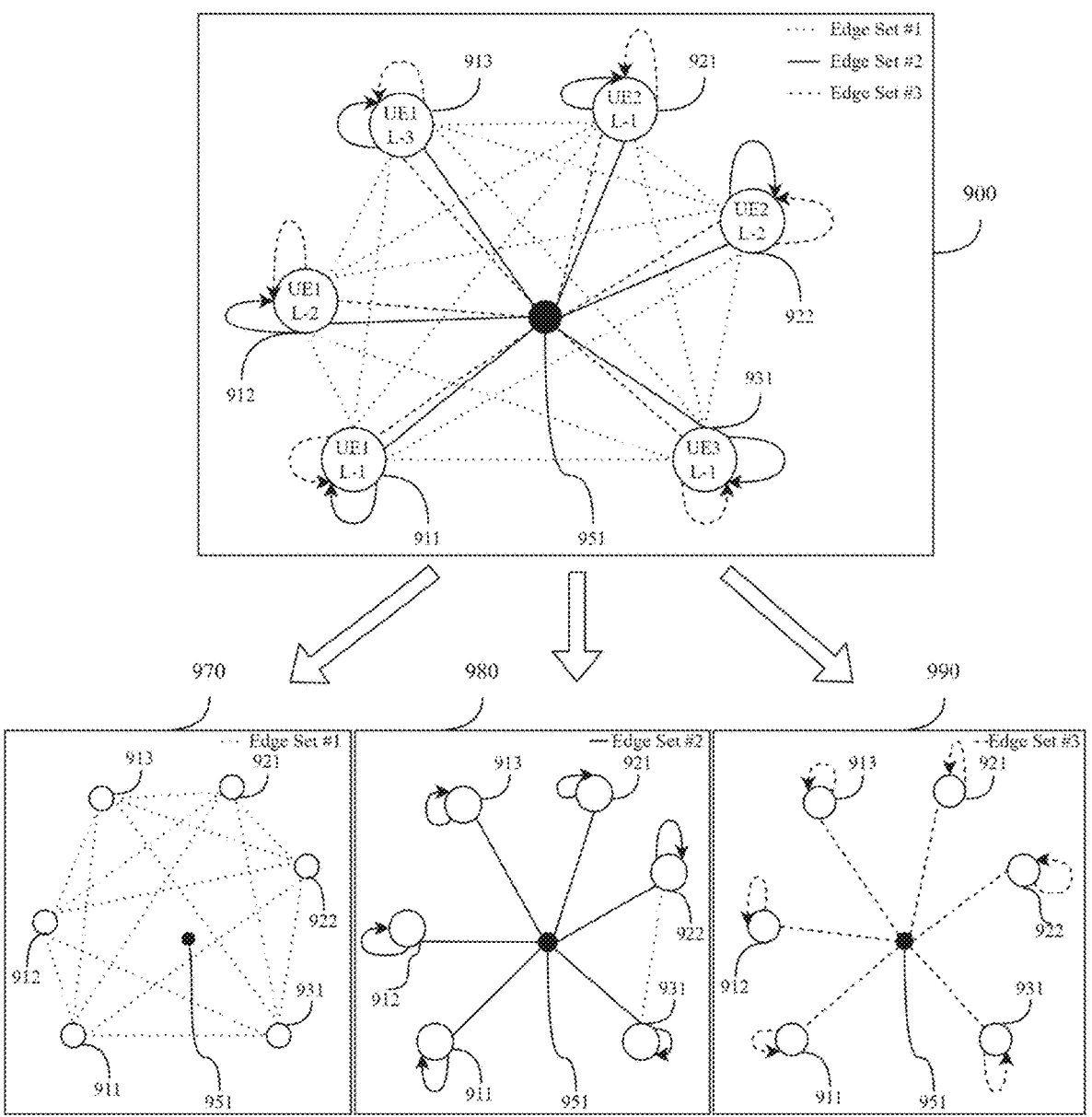
FIG. 9 shows an example of a representation of a graph in accordance with various aspects of this disclosure.

FIG. 9 shows an example of a representation of a graph in accordance with various aspects of this disclosure. A data processing module (e.g. the data processing module 701) may have obtained the graph 900 based on channel information and device information of a plurality of communication devices having established communication channels with a network access node (e.g. BS, RU, etc.). The plurality of communication devices may include communication devices, among which one or more communication devices are going to be selected to use a communication resource (e.g. a downlink communication resource for downlink transmission by the network access node). The communication resource may be an RBG.

The data processing module may have obtained input data as the graph 900 shown herein. For a single network access node, there may be a plurality of communication devices served by the network access node, each communication device may include a number $N_t$ of antennas configured to transmit radio communication signals and a number $N_r$ antennas configured to receive radio communication signals, and some of the communication devices may be inactive. We also assume that there are $N_u$ active communication devices in the network (for which the communication resource is going to be scheduled among $N_u$ communication devices). The channels between the base station and communication devices are configured such that there is $N_s$ number of sub-bands per RBG and $N_{rbg}$ is number of resource block groups (RBGs). The graph 900 is illustrated to include only three communication devices (UE1, UE2, UE3) and maximum three MIMO layers per communication device for brevity (for a sub-band). Accordingly, $N_u=3$ for the graph 900. The skilled person would recognize that there may be much more communication devices that are connected to the network access node waiting for a communication resource to be allocated. Aspects of obtained graph 900 are particularly discussed in view of FIG. 9. The data processing module may be configured to obtain the graph 900 as provided herein.

It may be assumed that each communication device may provide a channel rank (the number of MIMO layers) representing the channel rank of the communication device to the network access node and the corresponding SINR measurement per MIMO layer for each sub-band as a part of the channel information. In addition, each communication device may send transport block SINR measurements for each sub-band based on measurements of the respective communication device as a part of the channel information.

The network access node may also measure established communication channels for each sub-band with SRS through a sounding procedure to compute a precoding matrix for each communication device. There are certain notations to be used within this disclosure, such that the channel rank for each sub-band and for each communication device is defined as $p_{(s,u)}$ where $u \in \{1, 2, \ldots, N_u\}$ is a communication device index, and $s \in \{1, \ldots, N_s\}$ is a sub-band index. SINR measurements per MIMO layer is defined as $z_{(s,u,p)} \in R^+$, where $p \in \{1, \ldots, p_u\}$ is a MIMO layer index. Transport block SINR is defined as $y_{(s,u)} \in R^+$. In addition, it is further defined herein precoding matrices for each communication device for each sub-band as $V_{(s,u)} \in C^{(Nt \times Pu)}$. Each user weight for each communication device is defined as $q_u$.

The graph 900 may include nodes, wherein each node is associated with each MIMO layer of a plurality of communication devices. In this illustration, channel information indicates a number of MIMO layers for each communication device. Accordingly, the data processing module may obtain the graph 900 that includes a first node 911 associated with a first MIMO layer of UE1, a second node 912 associated with a second MIMO layer of UE1, a third node 913 associated with a third MIMO layer of UE1, a fourth node 921 associated with a first MIMO layer of UE2, a fifth node 922 associated with a second MIMO layer of UE2, and a sixth node 931 associated with a MIMO layer of UE3. Nodes 911, 912, 913, 921, 922, 931 may collectively be referred to as MIMO layer node. Furthermore, the graph 900 may further include a sub-band node 951 associated with the communication resource to be scheduled. Accordingly, the graph 900 may include $$\sum_{u=1}^{N_u} p_u + 1$$

number of nodes.

Each node 911, 912, 913, 921, 922, 931 may include, or may represent, input features associated with the respective MIMO layer and the respective UE. Input features may be based on, channel information and device information. For example, input features for each node may include the number of MIMO layers measurement of the communication device associated with the node, MIMO layer SINR measurement associated with the respective MIMO layer of the node, transport block SINR measurement of the communication device associated with the node, and the user fairness weight of the communication device associated with the node. In various examples, input features of a node may be represented as an input feature vector. Input features of the sub-band node 951 may be initialized as a zero vector. According to the example above, the input feature vector may be denoted as below, where (~) represents a normalization operation associated with the respective parameter:

$$f_{s,u,p}^0 = \left[ \tilde{p}_{s,u}, \tilde{z}_{s,u,p}, \tilde{y}_{s,u,p}, \tilde{q}_u \right]^T; u \in \{1, 2, \ldots, N_u\}, \quad (1)$$
$$s \in \{1, \ldots, N_s\}, p \in \{1, \ldots, p_u\}$$

The graph 900 may further include edges indicating, or representing, a relation between each node 911, 912, 913, 921, 922, 931, 951. In accordance with various aspects provided herein, the graph 900 may include a plurality of edge sets, wherein each set of edges represents a relation between the nodes 911, 912, 913, 921, 922, 931, 951 indicating an interdependence, a correlation, and/or an interaction associated with the established communication channels. Accordingly, the data processing module may obtain, based on the channel information and the device information, a plurality of edge sets, wherein each set is associated with a relation. In accordance with various aspects, the obtained graph 900 representing more than one relation may be processed by a multi-relational GNN, in accordance with various aspects provided herein.

As illustrated in the graph 900, the graph 900 may include three different edge sets. A first edge set (represented with dotted lines) may be based on a relation associated with cross-interference between communication devices. Accordingly, each edge (edge weight) of the first edge set may be based on estimated cross-interference between the respective MIMO layers associated with the nodes 911, 912, 913, 921, 922, 931. With respect to the relation associated with the cross-interference, the data processing module may obtain the first set of edges representing the relation associated with the cross-interference based on the channel information. In accordance with various aspects of this disclosure, each relation may be referred to as an attention criterion.

For example, the channel information may include SINR information and a precoding matrix of each communication device, and the data processing module 701 may obtain the first set of edges based on the SINR information and the precoding matrix of the respective communication devices of the respective nodes (MIMO layer nodes) 911, 912, 913, 921, 922, 931.

The graph 900 may scale input and hidden features with respect to pairwise calculated SINR with precoding matrix. A fully connected graph may be considered, as indicated, between every MIMO layer node 911, 912, 913, 921, 922, 931. The data processing module may calculate each edge weight based on the formula (2) for an edge coupling a node of subband s, communication device i, and MIMO layer k with a node of subband s, communication device j, and MIMO layer m as below, where $z_{s,i,k}$ is SINR of a communication device i for a MIMO layer k at subband s, $z_{s,j,m}$ is SINR of user j for MIMO layer m at subband s, and $v_{s,i,k}$ is precoder vector of user i for MIMO layer k at subband s, $v_{s,j,m}$ is precoder vector of user j for MIMO layer m at subband:

$$\gamma_{s,i,k-s,j,m} = \frac{z_{s,i,k}}{1 + p_i^2 z_{s,i,k} \sum_{m=1}^{pj} \left| v_{s,i,k}^H v_{s,j,m} \right|^2}, \text{ where } i \neq j \quad (2)$$

Self-edges of each of the nodes 911, 912, 913, 921, 922, 931, 951 of the first set of edges may not exist (may be set to zero). Furthermore, edges that are associated with the sub-band node 951 (e.g. respective sub-band for the graph 900 of a sub-band) may also be equal to zero. The obtained graph 900 may represent the first set of edges with an adjacency matrix associated with the cross-interference relation (i.e. cross-interference adjacency matrix; e.g. a beam correlation matrix). An exemplary cross-interference adjacency matrix that the data processing module may obtain based on the formula (2) can be represented as shown below, wherein edge weights of the edges coupling the sub-band node 951 are provided in the first row and column of the matrix:

$$C_s =$$

$$\begin{bmatrix} 0 & 0 & \cdots & 0 & 0 & \cdots & 0 & \cdots \\ 0 & 0 & \cdots & 0 & \gamma_{s,1,1-s,2,1} & \cdots & \gamma_{s,1,1-s,2,p-2} & \cdots \\ \vdots & \vdots & \ddots & \vdots & \vdots & \cdots & \vdots & \cdots \\ 0 & 0 & \cdots & 0 & \gamma_{s,1,p_1-s,2,1} & \cdots & \gamma_{s,1,p_1-s,2,p_2} & \cdots \\ 0 & \gamma_{s,1,1-s,2,1} & \cdots & \gamma_{s,1,1-s,2,p_2} & 0 & \cdots & 0 & \cdots \\ \vdots & \vdots & \ddots & \vdots & \vdots & \ddots & \vdots & \cdots \\ 0 & \gamma_{s,1,p_1-s,2,p_2} & \cdots & \gamma_{s,1,p_1-s,2,p_2} & 0 & \cdots & \ddots & \cdots \\ \vdots & \vdots & \vdots & \vdots & \vdots & \vdots & \vdots & \ddots \end{bmatrix} \in$$

$$\mathbb{R}^{|v| \times |v|}.$$

A second edge set (represented with continuous lines) may be based on a relation associated with user fairness between communication devices (e.g. based on UE weights). Accordingly, each edge (edge weight) of the second edge set may be based on user weights assigned or defined for the communication devices, wherein each user weight may represent a priority associated with a communication device among all communication devices. With respect to the relation associated with user fairness, the data processing module may obtain the second set of edges representing the relation associated with user fairness based on the device information.

For example, the device information may include predefined user weights associated with each communication device, and the data processing module may obtain the second set of edges based on the predefined user weights of the respective communication devices of the respective nodes. In various examples, the second set of edges may include edges having the same edge weight for nodes 911, 912, 913, 921, 922, 931 associated with the same communication device, when the edges couple the respective communication device to itself or to the sub-band node 951 (e.g. edges of the first node 911, the second node 912, and the third node 913 have the same edge weight that is a first edge weight; edges of the fourth node 921 and the fifth node 922 have the same edge weight that is a second edge weight, etc. which are self-edges or edges coupling the respective node to the sub-band node 951).

Each self-edge of MIMO layer nodes 911, 912, 913, 921, 922, 931 may be a value that is based on the user weight of the communication device associated with the respective node 911, 912, 913, 921, 922, 931. The self-edge of the sub-band node 951 may be initialized with a predefined value (e.g. 1). Edges coupling the sub-band node 951 to MIMO layer nodes 911, 912, 913, 921, 922, 931 may also have the same value that is based on the user weight. Edges between the other nodes (edges between two communication devices) may be equal to zero.

The obtained graph 900 may represent the second set of edges with an adjacency matrix associated with the user fairness relation (i.e. user fairness adjacency matrix). An exemplary user fairness adjacency matrix that the data processing module may obtain can be represented as shown below, in which the self-edge weight of each MIMO layer node is defined as $g_{s,u,p}$ for subband s, user u, and MIMO layer p, and the self-edge weight of sub-band node 951 is set to 1. The same weight $q_{s,u,p}$ is set for the edge between the sub-band node 951 and MIMO layer node for subband s, user u, and MIMO layer p, wherein edge weights of the edges coupling the sub-band node 751 are provided in the first row and column of the matrix:

$$Q_s = \begin{bmatrix} 1 & q_{s,1,1} & \cdots & q_{s,1,p_1} & q_{s,1,p_1} & \cdots & q_{s,2,p_2} & \cdots & q_{s,u,p_u} \\ q_{s,1,1} & q_{s,1,1} & 0 & 0 & 0 & 0 & 0 & \cdots & 0 \\ \vdots & 0 & \ddots & 0 & 0 & 0 & 0 & \cdots & 0 \\ q_{s,1,p_1} & 0 & 0 & q_{s,1,p_1} & 0 & 0 & 0 & \cdots & 0 \\ q_{s,2,1} & 0 & 0 & 0 & q_{s,2,1} & 0 & 0 & \cdots & 0 \\ \vdots & 0 & 0 & 0 & 0 & \ddots & 0 & \cdots & 0 \\ q_{s,2,p_2} & 0 & 0 & 0 & 0 & 0 & q_{s,2,p_2} & \cdots & 0 \\ \vdots & \vdots & \vdots & \vdots & \vdots & \vdots & \vdots & \ddots & 0 \\ q_{s,u,p_u} & 0 & 0 & 0 & 0 & 0 & 0 & 0 & q_{s,u,p_u} \end{bmatrix} \in \mathbb{R}^{|v| \times |v|}$$

$$A_s^0 = \begin{bmatrix} 1 & 1 & \cdots & 1 & 1 & \cdots & 1 & \cdots & 1 \\ 1 & q_{s,1,1} & 0 & 0 & 0 & 0 & 0 & \cdots & 0 \\ \vdots & 0 & \ddots & 0 & 0 & 0 & 0 & \cdots & 0 \\ 1 & 0 & 0 & q_{s,1,p_1} & 0 & 0 & 0 & \cdots & 0 \\ 1 & 0 & 0 & 0 & q_{s,2,1} & 0 & 0 & \cdots & 0 \\ \vdots & 0 & 0 & 0 & 0 & \ddots & 0 & \cdots & 0 \\ 1 & 0 & 0 & 0 & 0 & 0 & q_{s,2,p_2} & \cdots & 0 \\ \vdots & \vdots & \vdots & \vdots & \vdots & \vdots & \vdots & \ddots & 0 \\ 1 & 0 & 0 & 0 & 0 & 0 & 0 & 0 & q_{s,u,p_u} \end{bmatrix} \in \mathbb{R}^{|v| \times |v|}$$

A third edge set (represented with dashed lines) may be based on a relation associated with the likelihood of allocation (the likelihood of a communication device to be scheduled for the communication resource). In accordance with various aspects provided herein, the relation associated with the likelihood of allocation may be represented with an attention metric by using an attention mechanism. The attention metric may represent the importance of neighbor nodes for a node, wherein the neighbor nodes may be defined as other nodes having edges with the node. Accordingly, with respect to the relation that is indicative of, or representative of, the likelihood of allocation of the node, or the respective communication device of the nodes, the data processing module may obtain a third set of edges representing the relation of the likelihood of the allocation associated for the respective node.

For example, the data processing module may obtain the third set of edges for the graph 900 based on predefined user weights of the respective communication devices for the MIMO layer nodes 911, 912, 913, 921, 922, 931. Each self-edge of a node may be a value that is based on the user weight of the communication device associated with the respective node, similar to the second set of edges. Furthermore, edges coupling the sub-band node 951 and with MIMO layer nodes 911, 912, 913, 921, 922, 931 may be set to a predefined edge weight (e.g. 1), as the input data assigns the same importance for the plurality of communication devices.

In this illustrative example, the data processing module may obtain the third set of edges to provide an initialization for the attention metric. The obtained graph 900 may represent the second set of edges with an adjacency matrix associated for the user selection (i.e. user selection score adjacency matrix as representing the likelihood of the respective communication device to be scheduled for the communication resource). The self-edge weights of the MIMO layer nodes 911, 912, 913, 921, 922, 931 are defined as $q_{s,u,p}$. The self-edge weight of the sub-band node is set to 1. The edge weight between the sub-band node and the MIMO layer nodes 911, 912, 913, 921, 922, 931 may be initialized with a predefined value (e.g. 1). The data processing module may set the same user selection score for all MIMO layer nodes at all sub-bands, i.e., $q_{s,u,p} = \tilde{q}_u$, $\forall p \in \{1, \ldots, p_u\}$, $\forall s \in \{1, \ldots, N_s\}$. Here, $\tilde{q}_u$ is after some normalization of user fairness weight $q_u$. We also consider that we have the same edge weight among the MIMO layers of users at all sub-bands in RBG. Accordingly, an example user selection score adjacency matrix can be defined as the following matrix, wherein edge weights of the edges coupling the sub-band node 751 are provided in the first row and column of the matrix, where:

It is to be noted here that the exemplary initial user selection score adjacency matrix provided here may be considered to represent an initial likelihood of the respective communication device to be scheduled for the communication resource as equal, as shown with edge weights coupling the sub-band node 951 with the MIMO layer nodes 911, 912, 913, 921, 922, 931. An AI/ML may be configured to adjust the user selection score adjacency matrix with inferences to obtain the final likelihood of the respective communication devices to be scheduled for the communication resource. In accordance with various aspects of this disclosure, the output of the AI/ML representing the determined score may include the edge weights coupling the sub-band node 951 with the MIMO layer nodes 911, 912, 913, 921, 922, 931, as it is provided in this disclosure.

Accordingly, the graph 900 may be represented with three sub-graphs, each sub-graph is associated with a relation, as exemplarily provided herein. For example, a first sub-graph 970 may be a graph including the first edge set associated with cross-interference relation, a second sub-graph 980 may be a graph including the second edge set associated with user fairness, and a third sub-graph 990 may be a graph including the third edge set associated with the likelihood to be scheduled.

Referring back to FIG. 7, the processor 700 may further include a controller 703 to control the AI/ML module 702 and to control further operations provided herein associated with the scheduling communication devices, such as scheduling downlink transmissions, configuring rate allocation and MCS. The controller 703 may provide the input data to the AI/ML, or provide the AI/ML module 702 instructions to determine the one or more communication devices to be scheduled for a communication resource.

The AI/ML may be any type of machine learning model configured to receive the input data and provide an output as provided in this disclosure. The AI/ML may include any type of machine learning model suitable for the purpose. The AI/ML may include a decision tree model or a rule-based model suitable for various aspects provided herein. The AI/ML may include a neural network. The neural network may be any type of artificial neural network. The neural network may include any number of layers, including an input layer to receive the input data, an output layer to provide the output data. A number of layers may be provided between the input layer and the output layer (e.g. hidden layers). The training of the neural network (e.g., adapting the layers of the neural network, adjusting AI/ML parameters) may use or may be based on any kind of training principle, such as backpropagation (e.g., using the backpropagation algorithm).

For example, the neural network may be a feed-forward neural network in which the information is transferred from lower layers of the neural network close to the input to higher layers of the neural network close to the output. Each layer may include neurons that receive input from a previous layer and provide an output to a next layer based on certain AI/ML (e.g. weights) parameters adjusting the input information.

The AI/ML may include a graph neural network (GNN). GNNs may be considered as deep neural networks that are configured to process graph data including nodes (vertices) and edges provided herein. GNNs are characterized by using neural message passing by exchanging vector messages between nodes to update the vector message of the receiving node, that is mainly represented by an aggregate function that aggregates the information associated with its local neighborhood (other nodes coupled to the receiving node with an edge) of a receiving node and an update function that updates the information of the receiving node. With each iteration, each node embedding includes more information associated with input features provided in the graph 900.

The AI/ML may include a trained AI/ML that is configured to provide the output as provided in various examples in this disclosure based on the input data. The trained AI/ML may be obtained via an online and/or offline training. The training includes adjusting the machine learning model parameters stored in the memory. For the offline training, a training agent may train the AI/ML based on conditions of the device including the constraints of the device, category of the device, device capabilities, etc. at a past instance of time. Furthermore, the training agent may train the AI/ML using online training methods based on the latest (or actual) implementation conditions, such as the location of the device, etc. Furthermore, the processor may further optimize the AI/ML based on previous inference results, and possibly based on a performance metric with respect to the previous inference results and the effects obtained in response to the previous inference results.

The AI/ML may include a trained AI/ML that is configured to provide the output as provided in various examples in this disclosure based on the input data and one or more AI/ML parameters obtained by the training. The trained AI/ML may be obtained via an online and/or offline training. With respect to the offline training, a training agent may train the AI/ML based on conditions of a communication device configured to communicate using mobile radio communication technologies, in particular the communication technology that is to be used to communicate via the established communication channel, and attributes associated with the established communication channel in a past instance of time to schedule communication resources for communication devices. Furthermore, a training agent may train the AI/ML using online training methods based on the latest (or actual) implementation conditions, such as location of the communication device, previous or further weather conditions, number of communication devices, number of available MIMO layer, or other conditions that may affect communication channels. Furthermore, the AI/ML may be further optimize the AI/ML based on its inference results, and possibly based on a performance metric with respect to the inference results and the effects obtained in response to the inference results. A training agent may perform various operations with respect to the training at various aspects, including online training, offline training, and optimizations based on the inference results. The AI/ML may take any suitable form or utilize any suitable technique for training process. For example, the AI/ML may be trained using supervised learning, semi-supervised learning, unsupervised learning, or reinforcement learning techniques.

In supervised learning, the AI/ML may be obtained using a training set of data including both inputs and corresponding desired outputs (illustratively, input data may be associated with a desired or expected output for that input data). Each training instance may include one or more input data items and a desired output. The training agent may train the AI/ML based on iterations through training instances and using an objective function to teach the AI/ML to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

The training agent may adjust the AI/ML parameters of the respective model based on outputs and inputs (i.e. output data and input data). The training agent may train the AI/ML according to desired outcome. The training agent may provide the training data to the AI/ML to train the AI/ML. In various examples, the processor and/or the AI/ML unit itself may include the training agent, or another entity that may be communicatively coupled to the processor may include the training agent and provide the training data to the device, so that the processor may train the AI/ML.

In various examples, the device may include the AI/ML in a configuration that it is already trained (e.g. the AI/ML parameters in a memory are already set for the purpose). It may desirable for the AI/ML itself to have the training agent, or a portion of the training agent, in order to perform optimizations according to the output of inferences as provided in this disclosure. The AI/ML may include an execution unit and a training unit that may implement the training agent as provided in this disclosure for other examples. In accordance with various examples, the training agent may train the AI/ML based on a simulated environment that is controlled by the training agent according to similar considerations and constraints of the deployment environment.

In accordance with various aspects of this disclosure, the training input data may include, or may be based on, training channel information generated or obtained to represent various attributes of radio communication channels (e.g. measurements, various metrics representing the channel) and training device information generated or obtained to represent various attributes related to communication devices, as provided in this disclosure. Each training input data item may include channel information associated with an established communication channel of a communication device for an instance of a period of time, and context information of the communication device for the same instance of or the period of time. Training input data may further include training output data associated with the training input data indicating desired outcomes with respect to each set of training input data. Training output data may indicate the desired outcome with respect to training input data, so that the training agent may provide necessary adjustments to respective AI/ML parameters in consideration of the desired outcome. In various scenarios with respect to the training, an external agent (e.g. operator, user, etc.) may externally indicate desired outcomes for training input data via an interface.

A training agent may train the AI/ML by providing training input data to the input of the AI/ML and adjust AI/ML parameters of the AI/ML based on the output of the AI/ML and training output data associated with the provided training input data with an intention to make the output of the AI/ML more accurate. Accordingly, the training agent may adjust one or more AI/ML parameters based on a calculation including parameters for the output of the AI/ML for the training input data and the training output data associated with the training input data. In various examples, the calculation may also include one or more parameters of the AI/ML. With each iteration with respect to the training input data that may include many data items, and each data item may represent an input of an instance (of time, of observation, etc.) on various aspects and each iteration may iterate a respective data item representing an input of an instance, the training agent may accordingly cause the AI/ML to provide more accurate output through adjustments made in the AI/ML parameters.

A processor (e.g. the processor 700) may implement the training agent, or another entity that may be communicatively coupled to the processor may include the training agent and provide the training input data to the device, so that the processor may train the AI/ML. In various examples, the device may include the AI/ML in a configuration that it is already trained (e.g. the machine model parameters in the memory are set). It may desirable for the AI/ML itself to have the training agent, or a portion of the training agent, in order to perform optimizations according to the output of the inferences to be performed as provided in this disclosure. The AI/ML may include an execution unit and a training unit that may implement the training agent as provided in this disclosure for other examples.

Figure 10:
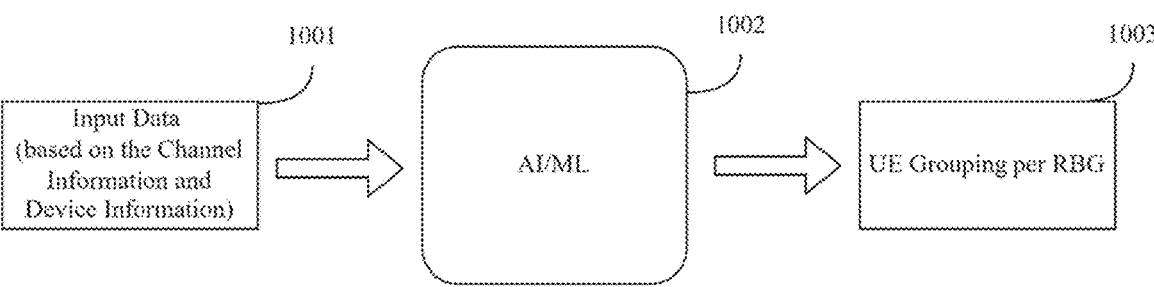
FIG. 10 shows an example of an AWL.

FIG. 10 shows an example of an AI/ML. The AI/ML 1002 may be configured to receive input data 1001 that is based on channel information and device information, as provided in various aspects of this disclosure. The input data 1001 may include the channel information and the device information of a plurality of communication devices. The input data 1001 may include one or more graphs (e.g. a graph for each sub-band corresponding to the sub-bands of the communication resource to be scheduled) that are based on the channel information and the device information. The input data 1001 may include information that is based on the channel information and the context information and transformed into a format that is suitable for the AI/ML 1002 to receive, such as input feature vectors associated with attributes of the channel information and the context information.

The AI/ML 1002 may be configured to provide an output 1003 that is indicative or representative of a score for each of the communication devices, wherein each score indicates, or represents, the likelihood for the respective communication device to be allocated or scheduled for the communication resource. As provided herein, the score may include an attention score representing inferenced attention parameter assigned by a GAT. In various examples, the output 1003 may include information representing the one or more communication devices selected from the plurality of communication devices, to which the respective communication device is to be allocated. In this illustrative example, the output 1003 includes UE grouping for the respective communication resource which is an RBG.

Figure 11:
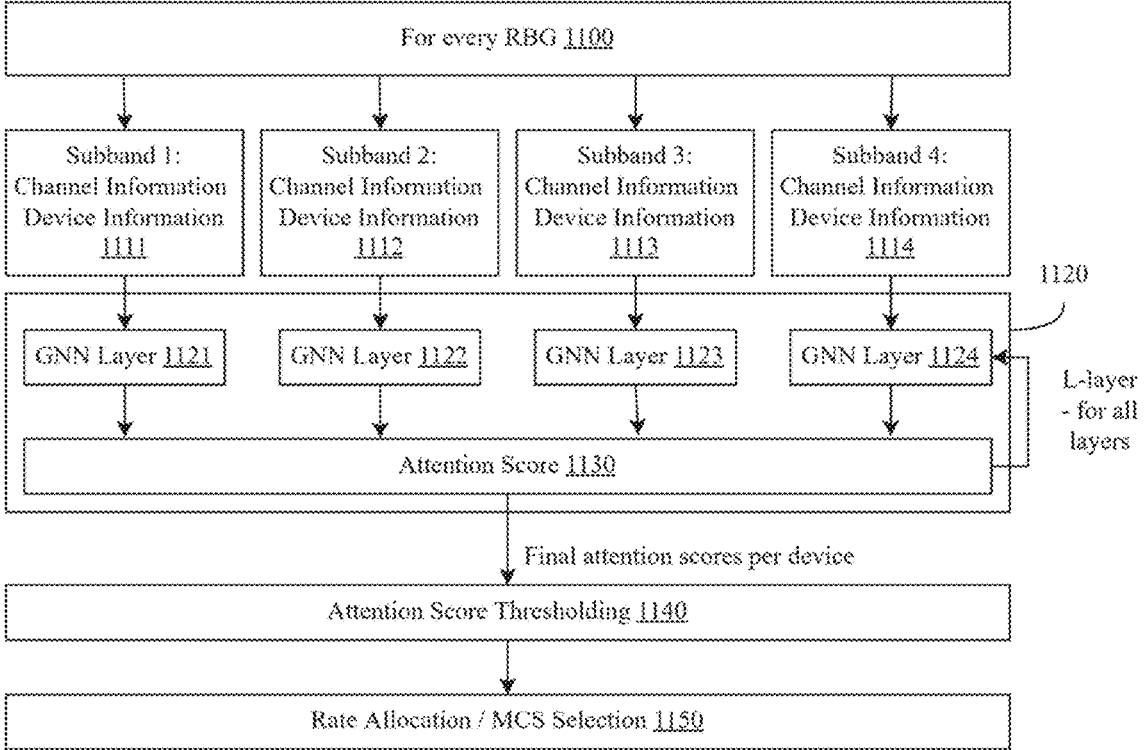
FIG. 11 shows an exemplary illustration of a scheduling procedure.

FIG. 11 shows an exemplary illustration of a scheduling procedure in accordance with various aspects of this disclosure. A processor (e.g. the processor 700) may perform operations associated with determining one or more communication devices from a plurality of communication devices for every communication resource of an RBG 1100.

The processor may provide input data for all sub-bands to a GNN 1120. Accordingly, for each RBG, in an illustrative example of RBG including four sub-bands, the processor may obtain a first graph 1111 including, or based on, a first sub-band channel information including channel information for a first sub-band and device information, and provide the first graph 1111 to an input layer of a first GNN layer 1121. Similarly, for each sub-band, the processor may obtain a second graph 1112, a third graph 1113, and a fourth graph 1114, and may provide the inputs to input layer of a second GNN 1122 layer, a third GNN 1123 layer, and a fourth GNN 1124 layer, respectively. The skilled person would recognize that separate GNN layers are provided only for the purpose of an easier representation, and the GNN 1120 may include further layers, and each GNN layer 1121, 1122, 1123, 1124 of which their properties are provided in this disclosure may be referred to as attention layers. The AI/ML associated with the GNN 1120 may include a single GNN architecture to perform operations to process input data associated with different sub-bands similarly.

Each graph may include a plurality of nodes for the plurality of communication devices, wherein each node is associated with a MIMO layer of one of the communication devices, and a sub-band node associated with its respective sub-band. Each input graph of a sub-band may be represented with, and may include, an input feature matrix and at least one adjacency matrix, wherein the input feature matrix includes an input feature vector for each node of the respective sub-band in a concatenated formation, as provided exemplarily with formula (1), for the plurality of nodes, which may be denoted as below, where $$f_s^0$$

being initialized input vector associated with the sub-band node $$(e.g. f_s^0 = [0, 0, 0, 0]^T):$$

$$F_s^0 = \left[ f_s^0, f_{s,1,1}^0, f_{s,1,p_u}^0, \cdots, f_{s,N_u,p_{N_u}}^0 \right]^T \in \mathbb{R}^{|\mathcal{V}| \times 4} \tag{3}$$

The GNN 1120 may be an L-layer diffusion convolutional GNN and each GNN 1121, 1122, 1123, 1124 may be configured to operate as a layer of an L-layer diffusion convolutional GNN, wherein the number L can be defined as a hyperparameter. The number L may be predefined in a manner that it optimizes the performance of the GNN 1120. As an example, L may be 4, representing that four iterations are to be performed for neural message passing between nodes.

The output of each layer GNN layer 1121, 1122, 1123, 1124, or in other words layer-wise propagation rule of each GNN layer, may be denoted as below in very simple terms (e.g. without bias parameters, with self-edges to provide update function, etc.), in which $$F_s^l$$

denotes the feature matrix received by a layer from a previous layer and $$F_s^{l+1}$$

5 denotes the feature matrix outputted by the layer to a next layer, a denotes an activation function used by the layer (e.g. a sigmoid activation function, a rectified liner unit activation function (ReLU)), $$A_s^l$$

denotes adjacency matrix (that may be symmetrically normalized) used by the layer, and $$W_s^l$$

denotes AI/ML parameters used by the layer:

$$F_s^{l+1} = \sigma\left(A_s^l F_s^l W_s^l\right) \tag{4}$$

In accordance with various aspects provided herein, the GNN may include a GAT. GATs incorporate an attention mechanism into the processing of input data in a manner that the attention computation is performed multiple times in an independent manner to compute the embedding of each node by attending within its neighborhood. In general, given a target graph object $o_0$ and a set of graph objects in $o_0$'s neighborhood $N_{oo}$, graph attention may be represented as a function f: $\{o_0\} \times N_{oo} \rightarrow [0, 1]$ mapping each of graph object in $N_{oo}$ to an attention score. The graph object mentioned here can be node, edge, or sub-graph.

For this purpose, each GNN layer 1121, 1122, 1123, 1124 may be configured to obtain an attention score (at least) associated with each communication device at each layer based on input features of nodes associated with the respective communication device and input features of the sub-band node. Each GNN layer 1121, 1122, 1123, 1124 may obtain the attention score for a node coupled to the sub-band node based on the formulation below, where, for l being a layer index, s being a sub-band index, j being an index of a node associated with a communication device, the node being coupled to the sub-band node, $$e_{s,j}^l$$

being a parameter representing the importance, $\sigma$ being an activation function, $a_s$ being learnable attention weights (attention AI/ML parameters), W being AI/ML parameters of the respective layer, $$f_s^{l-1}$$

being input features associated with the sub-band node, $$f_{s,j}^{l-1}$$

being input features associated with a node coupled to the sub-band node;

$$e_{s,j}^l = \sigma\left(a_s^T \left[W f_s^{l-1} \| W f_{s,j}^{l-1}\right]\right) \tag{5}$$

It can be seen from the formula that AI/ML parameter matrix W transform feature vectors of respective nodes. The transformed feature vectors are concatenated, then mapped to an importance score representing the importance of node j (e.g. a MIMO layer node associated with a communication device) to the sub-band node by learnable attention weights a. The parameter e provided in formula (5), which is referred to as the parameter representing the importance, may be normalized with a normalization function to obtain the attention score, where $N_j$ being the number of nodes coupled to the sub-band node:

$$a_{s,j}^l = \text{softmax}\left(e_{s,j}^l\right) = \frac{\exp\left(e_{s,j}^l\right)}{\sum_{j=1}^{N_j} \exp\left(e_{s,j}^l\right)} \tag{6}$$

Therefore, each GNN layer 1121, 1122, 1123, 1124 may be configured to determine an attention score for (at least) each MIMO layer node associated with a MIMO layer of one of the communication devices based on attention AI/ML parameters (that may include learnable parameters) of the respective GNN layer and output of the respective GNN layer. The attention score may represent the importance of the nodes associated with each MIMO layer of one of the communication devices. In various examples, each attention score may represent the importance of one of the MIMO layer nodes relative to the sub-band node. In various examples, each attention score may represent the importance of an edge coupling a MIMO layer node to the sub-band node.

In various examples, the GNN 1120 may be a multi-headed graph attention network (MH-GAT). In such an example, the GNN 1120 may be configured to aggregate independent single-headed attention layers to form a single layer. In such an example, each attention score for each communication device (having a node coupled to the sub-band node) may represent the combined importance of nodes that are associated with the respective communication device for all sub-bands.

Once the iterations of the GNN layers 1121, 1122, 1123, 1124 as provided herein are finalized, a layer (e.g. an output layer) of the GNN layers 1121, 1122, 1123, 1124 may output 1130 the attention scores for each communication device. In various examples, the output of the last attention computation may represent the importance of nodes coupling the sub-band node. Accordingly, each attention score associated with the coupling of a node to the sub-band node, about which various examples are provided herein, may represent a likelihood for the communication device to be allocated for the designated communication resource. In various examples, the output 1130 of the last attention computation may represent the importance of edges coupled to the sub-band node. Accordingly, each attention score may be associated with an edge coupling a node of a communication device to the sub-band node. As provided in various examples herein, each attention score may represent the determined score representing, or indicating, the likelihood of the respective communication device to be allocated or to be scheduled for the communication resource (RGB).

In various examples, each GNN layer 1121, 1122, 1123, 1124 may output 1130 an attention score that is the last attention weight obtained by the respective GNN layer 1121, 1122, 1123, 1124. Each attention score associated with all MIMO layers of each communication device may be the same attention score. In such an example, the attention score itself may represent the likelihood of the respective communication device to be scheduled for the communication resource. In other examples, a processor may combine each attention score obtained for a MIMO layer of one of the communication devices to obtain a communication device attention score that may represent the likelihood of the respective communication device. The processor may perform the combination with any known methods, such as average, weighted average, etc.

Referring back to FIG. 9, each GNN layer 1121, 1122, 1123, 1124 may receive the input data including the graph 900 having input features for nodes and a plurality of edge sets. Each GNN 1121, 1122, 1123, 1124 may be configured to process input data with multiple relations. The input sets may be represented with an input feature matrix $$F_s^0,$$

and adjacency matrices $C_s$ representing the relation associated with the cross-interference, $Q_s$ representing the relation associated with user fairness, and $$A_s^{l=0}$$

representing an initialized attention matrix, where l is the layer index associated with the GNNs 1121, 1122, 1123, 1124, and s represents the sub-band with a further note that each GNN layer 1121, 1122, 1123, 1124 may perform processing associated with one of the s sub-bands. In accordance with various aspects of this disclosure, each relation may be referred to as an attention criterion. Examples associated with these matrices are provided in accordance with FIG. 9.

In accordance with various aspects provided herein, the GNN may include a MEI-GAT. Therefore, each GNN layer 1121, 1122, 1123, 1124 may be configured to determine an attention score for (at least) each MIMO layer node associated with a MIMO layer of one of the communication devices based on attention AI/ML parameters (that may include learnable parameters) of the respective GNN layer and output of all GNN layers 1121, 1122, 1123, 1124.

The output of each layer GNN layer 1121, 1122, 1123, 1124, or in other words layer-wise propagation rule of each GNN layer, may be denoted as below in very simple terms (e.g. without bias parameters, graphs with self-edges to provide update function, etc.), in which $$F_s^l$$

denotes the feature matrix received by a layer, represented by l between 0 and L−1, and $$F_s^{l+1}$$

denotes the feature matrix outputted by the layer for an input of a next layer, σ denotes an activation function used by the layer (e.g. a sigmoid activation function, a rectified liner unit activation function (ReLU)), $$A_s^l$$

denotes the attention matrix (that may be symmetrically normalized) used by the layer, $$W_a^l$$

denotes attention AI/ML parameters used by the layer, $C_s$ denotes the cross-interference adjacency matrix representing the relation associated with the cross-interference, $Q_s$ denotes the user fairness adjacency matrix representing the relation associated with the user fairness, $$W_c^l$$

denotes cross-interference AI/ML weight matrix representing AI/ML parameters used by the layer for the cross-interference relation, $$W_q^l$$

denotes user fairness weight matrix representing AI/ML parameters used by the layer for the user fairness relation, where $$W_a^l, W_c^l, \text{ and } W_q^l$$

may be collectively referred to as AI/ML parameters in this disclosure:

$$X_s^l = A_s^l F_s^l W_a^l + C_s F_s^l W_c^l + Q_s F_s^l W_q^l \text{ and} \tag{7}$$

$$F_s^{l+1} = \sigma(X_s^l), \text{ where}$$

$$F_s^0 = \left[ f_s^0, f_{s,1,1}^0, f_{s,1,p_u}^0, f_{s,N_u,p_{N_u}}^0 \right]^T \in \mathbb{R}^{|\mathcal{N}| \times N_{input}}. \tag{8}$$

As can be seen from the formula, $C_s$ and $Q_s$ adjacency matrices are fixed. Attention matrix may include attention scores calculated by each layer. The input data may include an initial attention matrix received by layer l=0 as provided herein $$A_s^0.$$

Each GNN layer 1121, 1122, 1123, 1124 may be configured to perform aggregation and update operations to obtain an output attention matrix including attention scores obtained at the output of the respective layer index l.

As seen from $$A_s^0,$$

the initial attention score matrix may include a matrix associated with its respective input graph representing one edge between the sub-band node and MIMO layer node of each communication device, and a self-edge at each node. The self-edge weight of each MIMO layer node is defined as $q_{s,u,p}$. Self-edge weight of virtual subband vertex is defined as a predefined value (e.g. 1). After its initialization, as outputs of each layer 1121, 1122, 1123, 1124 the attention matrix may be represented as below, where $$a_{s,u,p}^l$$

denotes attention scores representing the importance of a node associated with a MIMO layer p of a communication device u for a sub-band s to the respective sub-band node associated with sub-band s:

$$A_s^l = \begin{bmatrix} 1 & a_{s,1,1}^l & \cdots & a_{s,1,p_1}^l & a_{s,2,1}^l & \cdots & a_{s,2,p_2}^l & \cdots & a_{s,u,p_u}^l \\ a_{s,1,1}^l & q_{s,1,1} & 0 & 0 & 0 & 0 & 0 & \cdots & 0 \\ \vdots & 0 & \ddots & 0 & 0 & 0 & 0 & \cdots & 0 \\ a_{s,1,p_1}^l & 0 & 0 & q_{s,1,p_1} & 0 & 0 & 0 & \cdots & 0 \\ a_{s,2,1}^l & 0 & 0 & 0 & q_{s,2,1} & 0 & 0 & \cdots & 0 \\ \vdots & 0 & 0 & 0 & 0 & \ddots & 0 & \cdots & 0 \\ a_{s,2,p_2}^l & 0 & 0 & 0 & 0 & 0 & q_{s,2,p_2} & \cdots & 0 \\ \vdots & \vdots & \vdots & \vdots & \vdots & \vdots & \vdots & \ddots & 0 \\ a_{s,u,p_u}^l & 0 & 0 & 0 & 0 & 0 & 0 & 0 & q_{s,u,p_u} \end{bmatrix} \in \mathbb{R}^{|V| \times |V|}$$

As can be seen from $$A_s^l,$$

the edge weights between the sub-band node and MIMO layer nodes are denoted as $\alpha_{s,u,p}$ as attention scores representing the importance of nodes coupled to the sub-band node to the sub-band node. Self-edge-weight values $q_{s,u,p}$ may be fixed for all nodes associated with the communication device for all MIMO layers and all sub-bands (i.e., $q_{s,u,p} = \tilde{q}_u$, $\forall p \in \{1, \ldots, p_u\}$, $\forall s \in \{1, \ldots N_s\}$. Here, $\tilde{q}_u$ is after some normalization of user fairness weight $q_u$), and each self-edge-weight value may be based on user fairness weights. Furthermore, each GNN layer 1121, 1122, 1123, 1124 may be configured to determine attention scores $a_{s,u,p}$ in a manner that every attention score obtained for nodes associated with the same communication device at multiple MIMO layers and multiple sub-bands may have the same value (i.e., $a_{s,u,p}$ is the same for $\forall p \in \{1, \ldots, p_u\}$ and $\forall s$ in RBG ($s \in \{1, \ldots, N_{rbg}\}$).

Accordingly, each GNN layer 1121, 1122, 1123, 1124 may be configured to obtain an attention score for each communication device by obtaining an attention score for nodes that are associated with each MIMO layer of each communication device for each sub-band and that are coupled to the sub-band node (or alternatively for edges, each edge coupling a MIMO layer of a communication device for a sub-band to a sub-band node). In other words, each GNN layer 1121, 1122, 1123, 1124 may be configured to obtain an attention score for each MIMO layer based on input features of the respective node that is associated with the respective MIMO layer, which are received by the respective GNN layer and input features of the sub-band node that is associated with the sub-band node, which are received by the respective GNN layer, and attention AI/ML parameters designated for attention. For example, each GNN layer 1121, 1122, 1123, 1124 may be configured to calculate the attention score based on formula (6).

In a multi-headed approach, the GNN 1120 may obtain an attention score, for each communication device, by aggregating independent single-headed attention layers. In such an example, each attention score for each communication device (having a node coupled to the sub-band node) may represent the combined importance of nodes that are associated with the respective communication device for all sub-bands, and for all MIMO-layers.

Accordingly, as provided in this illustrative example including a plurality of GNN layers 1121, 1122, 1123, 1124 and each layer is configured to receive sub-band input data associated with one of the sub-bands of the communication resource to be scheduled for a plurality of communication devices, the GNN 1120 may be configured to provide an output including attention scores for each communication device, wherein each attention score includes a combination of sub-band attention scores obtained for the respective communication device for each sub-band. In various examples, each attention score further includes a combination of MIMO layer scores obtained for the respective communication device for each of its MIMO layers.

For example, each GNN layer 1121, 1122, 1123, 1124 may be configured to obtain an attention score for each communication device $$a_{s,u,p}^l$$

as provided in the attention matrix $$A_s^l$$

with an aggregation function applied to all attention scores obtained for the respective communication device for all sub-bands and all MIMO layers. Accordingly, each GNN layer 1121, 1122, 1123, 1124 may obtain attention scores $a_{s,u,p}$ in a manner that every attention score obtained for nodes associated with the same communication device at multiple MIMO layers and multiple sub-bands may have the same value (i.e., $a_{s,u,p}$ is the same for $\forall p \in \{1, \ldots, p_u\}$ and $\forall s$ in RBG ($s \in \{1, \ldots, N_{rbg}\}$).

In various examples, the GNN 1120 may be configured to obtain an attention score a u for each communication device, u being a communication device index, at each attention layer (layer index being l) (e.g. GNN layer 1121, 1122, 1123, 1124) based on input features associated with the sub-band node $$(f_s^l),$$

and based on input features associated with all MIMO layer nodes associated with the respective communication device u at all sub-bands $$\left(\sum\nolimits_{s=1}^{N_s} \sum\nolimits_{p=1}^{p_u} E_2 f_{s,u,p}^l\right).$$

In one example, the GNN may include one or more attention layers that are configured to receive input including layer-input features associated with the sub-band and layer-input features associated with all MIMO layer nodes associated with a communication device at all sub-bands and provide an output representing an attention score for the respective communication device based on attention AI/ML parameters associated with the respective layer.

In various examples, the GNN 1120 may be configured to obtain attention scores $$a_{s,u,p}^l$$

as provided in the attention matrix $$A_s^l$$

based on the formula below, where $\sigma$ denotes an activation function (e.g. a sigmoid activation function or a ReLU activation function), $b \in R^{2F_{out} \times 1}$ being learnable attention weight parameters, $E_1 \in R^{F_{out} \times F_{out}}$, $E_2 \in R^{F_{out} \times F_{out}}$ being AI/ML parameters, and $\|$ being concatenation operators for feature vectors:

$$a_{s,u,p}^l = \sigma\left(b^T\left[E_1 f_s^l \| \frac{\sum_{s=1}^{N_s} \sum_{p=1}^{p_u} E_2 f_{s,u,p}^l}{|N_s|\left(\sum_{u=1}^{N_u} p_u + 1\right)}\right]\right) \quad (9)$$

Once the iterations of the GNN layers 1121, 1122, 1123, 1124 as provided herein are finalized, a layer (e.g. an output layer) of the GNN layers 1121, 1122, 1123, 1124 may output 1130 the attention scores for each communication device, as exemplarily provided attention scores obtained based on formula (9) at the last attention layer. In various examples, the output of the last attention score $$a_{s,u,p}^{l=L-1}$$

may represent the importance of nodes coupling the sub-band node. Accordingly, each attention score associated with the coupling of a node associated with a communication device to the sub-band node, about which various examples are provided herein, may represent a likelihood for the communication device to be allocated for the designated communication resource. In various examples, the output 1130 of the last attention computation may represent the importance of edges coupled to the sub-band node. As provided in various examples herein, each attention score may represent the determined score representing, or indicating, the likelihood of the respective communication device to be allocated or to be scheduled for the communication resource (RGB).

In various examples, each GNN layer 1121, 1122, 1123, 1124 may output 1130 an attention score that is the last attention score obtained by the respective GNN layer 1121, 1122, 1123, 1124. Each attention score associated with all MIMO layers of a respective communication device may be the same attention score, as can be seen from formula (9). In such an example, the attention score itself may represent the likelihood of the respective communication device to be scheduled for the communication resource. In other examples, a processor may combine each attention score obtained for a MIMO layer of one of the communication devices to obtain a communication device attention score that may represent the likelihood of the respective communication device. The processor may perform the combination with any known methods, such as average, weighted average, etc.

Figure 12:
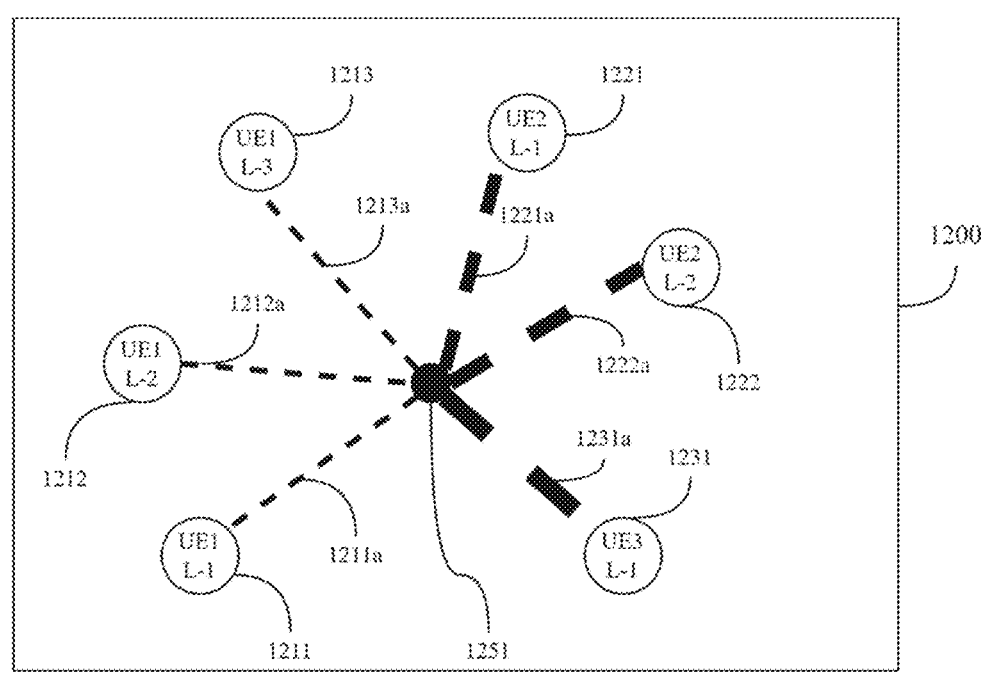
FIG. 12 shows an example of a graph representation of the output of a GNN.

FIG. 12 shows an example of a graph representation of the output of the GNN 1120 for an example input graph of 900. The graph 1200 includes, analogous to graph 900, a first node 1211, a second node 1212, and a third node 1213, each associated with a MIMO layer of a first UE corresponding to nodes 911, 912, and 913, a fourth node 1221, and a fifth node 1222, each associated with a MIMO layer of a second UE corresponding to nodes 921 and 921, a sixth node 1231 associated with a MIMO layer of a third UE corresponding to node 931, and a seventh node 1251 associated with the communication resource corresponding to the sub-band node 951. The output of the GNN 1120 may include a plurality of graphs for each sub-band. In various examples, as provided herein, each set of attention scores obtained for each sub-bands of the communication resource may be equal. In various examples, the GNN 1120 may provide an output including one graph for all sub-bands.

The graph 1200 may include edges 1211a, 1212a, 1213a, 1221a, 1222a, 1231a, coupling each communication device node 1211, 1212, 1213, 1221, 1222, 1231 to the communication resource node 1251 and edge weight of each edge 1211a, 1212a, 1213a, 1221a, 1222a, 1231a may represent an attention score to indicate importance of a communication device node 1211, 1212, 1213, 1221, 1222, 1231 to the communication resource node 1251.

In accordance with various aspects provided herein, edge weights (i.e. attention scores) of edges coupling the nodes associated with the same communication device to the communication resource node 1251 may have the same edge weight. Accordingly, the edge weights of edges associated with the first UE 1211a, 1212a, 1213a are equal to each other. Similarly, edge weights of edges associated with the second UE 1221a, 1222a are equal to each other. Accordingly, any one of edge weight of the edges 1211a, 1212a, 1213a may represent the likelihood of the first UE to be allocated and/or scheduled for the communication resource (e.g. RBG), any one of edge weight of the edges 1221a,

1222*a* may represent the likelihood of the second UE to be allocated and/or scheduled for the communication resource, and the edge weight of the edge 1231*a* may represent the likelihood of the third UE to be allocated and/or scheduled for the communication resource.

Referring back to FIG. 11 together with FIG. 12, the processor may perform a thresholding operation 1140 to select one or more communication devices to be scheduled for the communication resource based on the attention scores determined by the GNN 1120. The thresholding operation may be based on a predefined threshold value (e.g. scheduling UEs having attention scores above the predefined threshold value) or may be based on any other thresholding methods (e.g. adaptive thresholding methods, averaging, etc.). In accordance with various aspects provided herein, the GNN 1120 may also be configured to perform a thresholding operation, and in such example, the GNN 1120 may output information representing, or indicating, the communication devices to be allocated or scheduled for the respective communication resource.

In this illustrative example, the processor (via implementation of the GNN 1120, or another function performed by the processor) may determine to allocate and/or schedule the second UE and the third UE for the RBG based on their attention scores represented by edge weights of the edges 1221*a* or 1222*a*, and 1331*a*.

Based on the determined attention scores, the processor may further allocate 1150 data rate for the communication devices that are selected for the communication resource. In accordance with various aspects, a bigger attention score may indicate a higher data rate for the respective communication device. Accordingly, the processor may allocate higher data rates for communication devices having higher attention scores, and accordingly, the processor may determine an MCS for a communication device selected for the communication resource based on the attention score. The processor may then encode information including information representing, or indicating, the determined MCS for a transmission to the respective communication device.

Furthermore, the processor may perform further operations to allocate and/or schedule communication resources for selected communication devices according to any known methods. In this illustrative example, the processor may schedule downlink transmissions to be performed to the second UE and the third UE using the time and frequency resources associated with RBG. The processor may control a transceiver to transmit radio communication signals to the second UE and the third UE with selected beams to perform the transmission. The processor may further control the transceiver to transmit radio communication signals using the time and frequency resources of the RBG.

Figures 13A, 13B:
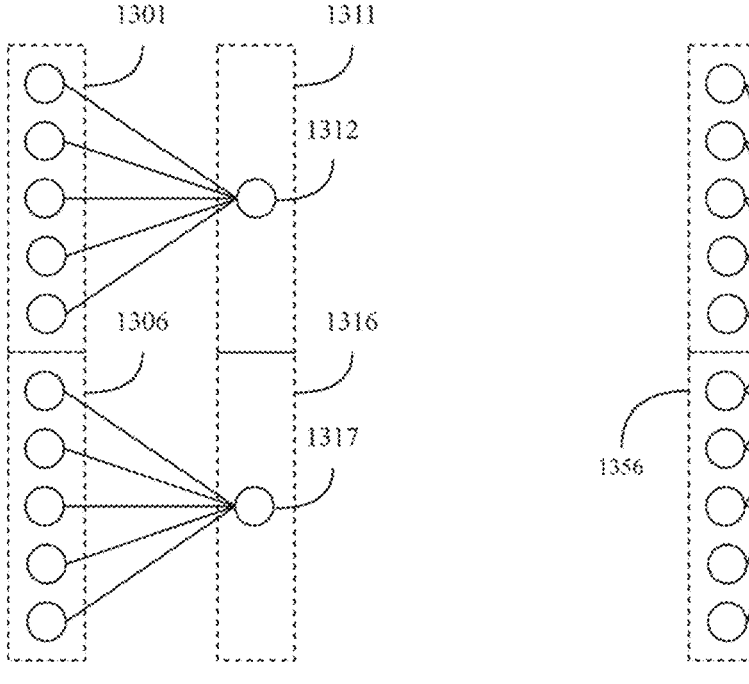
FIG. 13A shows an exemplary representation of various aspects of a GNN.
FIG. 13B shows an exemplary representation of various aspects of a GNN.

FIG. 13A shows an exemplary representation of various aspects of a GNN. The illustrative example is provided for an example of a communication resource to be scheduled at two sub-bands in accordance with various aspects of this disclosure. The GNN (e.g. the GNN 1120) may include a plurality of layers, some of which may be attention layers configured to obtain an attention score. In this illustrative example, a first portion 1301 of a layer is configured to perform calculations for a first set of features (represented by circles) of a communication device, which the first set of features includes features associated with the communication device at a first sub-band, and a second portion 1306 of the layer is configured to perform calculations for a second set of features of the communication device, which the second set of features includes features associated with the communication device at a second sub-band. The layer may be an input layer, a hidden layer, or an output layer. Accordingly, features may be input features or hidden features.

The GNN may be configured to determine an attention score for the communication device for each sub-band. Accordingly, the first portion 1301 of the layer may provide an output to a first portion 1311 of a further layer including features associated with the communication device at the first sub-band, wherein the output may include a first attention score 1312 that is obtained based on the first set of features. The first attention score 1312 may represent the importance of the communication device (to another entity in the graph (e.g. sub-band node as provided in accordance with FIG. 11 based on features associated with the sub-band node that is not shown here)) for the first sub-band. Similarly, the second portion 1306 of the layer may provide an output to a second portion 1316 of the further layer, wherein the output may include a second attention score 1317 that is obtained based on the second set of features. The second attention score 1317 may represent the importance of the communication device (to another entity in the graph (e.g. sub-band node as provided in accordance with FIG. 11 based on features associated with the sub-band node that is not shown here)) for the second sub-band.

In this illustrative example, the GNN may output one final attention score for the communication device that is based on a first final attention score obtained at the first sub-band and a second final attention score obtained at the second sub-band (and also further final attention scores obtained at further sub-bands). The GNN may combine the first final attention score and the second final attention score (and further final attention scores) to obtain the one final attention score. In various examples, the GNN may output attention scores obtained for each sub-band (e.g. the first final attention score, the second final attention score), and a processor may obtain one final attention score based on the output of the GNN to be used for allocation and/or scheduling communication resources.

FIG. 13B shows an exemplary representation of various aspects of a GNN. The illustrative example is provided for an example of a communication resource to be scheduled at two sub-bands in accordance with various aspects of this disclosure. The GNN (e.g. the GNN 1120) may include a plurality of layers, some of which may be attention layers configured to obtain an attention score. In this illustrative example, a first portion 1351 of a layer is configured to perform calculations for a first set of features (represented by circles) of a communication device, which the first set of features includes features associated with the communication device at a first sub-band, and a second portion 1356 of the layer is configured to perform calculations for a second set of features of the communication device, which the second set of features includes features associated with the communication device at a second sub-band. The layer may be an input layer, a hidden layer, or an output layer. Accordingly, features may be input features or hidden features.

The GNN may be configured to determine an attention score for the communication device for all sub-bands. Accordingly, the first portion 1351 of the layer may provide an output to a first portion 1361 of a further layer including features associated with the communication device at the first sub-band, wherein the output may include a first attention score 1362 that is obtained based on the first set of features and the second set of features. The first attention score 1362 may represent the importance of the communication device (to another entity in the graph (e.g. sub-band node as provided in accordance with FIG. 11 based on features associated with the sub-band node that is not shown here)) for both the first sub-band and the second sub-band (e.g. for all sub-bands). Similarly, the second portion 1356 of the layer may provide an output to a second portion 1366 of the further layer, wherein the output may include a second attention score 1367 that is obtained based on the first set of features and the second set of features. The second attention score 1317 may represent the importance of the communication device (to another entity in the graph (e.g. sub-band node as provided in accordance with FIG. 11 based on features associated with the sub-band node that is not shown here)) for both the first sub-band and the second sub-band (e.g. for all sub-bands) and may be equal to the first attention score 1362.

In this illustrative example, the GNN may output one final attention score for the communication device that is based on the final attention score (output of the last attention layer) obtained at all sub-bands.

The GNN approach, as disclosed herein, may reduce computation complexity compared to other approaches, e.g. compared to the greedy algorithm. Considering for example a scenario with a user rank 4, the real multiplication per a communication resource of an RBG with a greedy algorithm may be $10.83 \times 10^6$, whereas with the GNN approach may be $1.5 \times 10^6$, providing a reduction in complexity with the GNN of 86.2%. Considering a scenario with a user rank 3, the real multiplication per RBG with a greedy algorithm may be $12.99 \times 10^6$, whereas with the GNN approach may be $0.93 \times 10^6$, providing a reduction in complexity with the GNN of 92.8%. Considering a scenario with a user rank 2, the real multiplication per RBG with a greedy algorithm may be $6.02 \times 10^6$, whereas with the GNN approach may be $0.447 \times 10^6$, providing a reduction in complexity with the GNN of 92.5%. Considering a scenario with a user rank 1, the real multiplication per RBG with a greedy algorithm may be $1.73 \times 10^6$, whereas with the GNN approach may be $0.136 \times 10^6$, providing a reduction in complexity with the GNN of 92.2%.

The GNN approach may thus provide about 10× reduction in complexity compared to using the greedy algorithm. Additionally, tests using behavior cloning showed that selecting users using the GNN technique may provide 96% of weighted sum rate of the users (e.g., using simple supervised learning training techniques).

Figure 14:
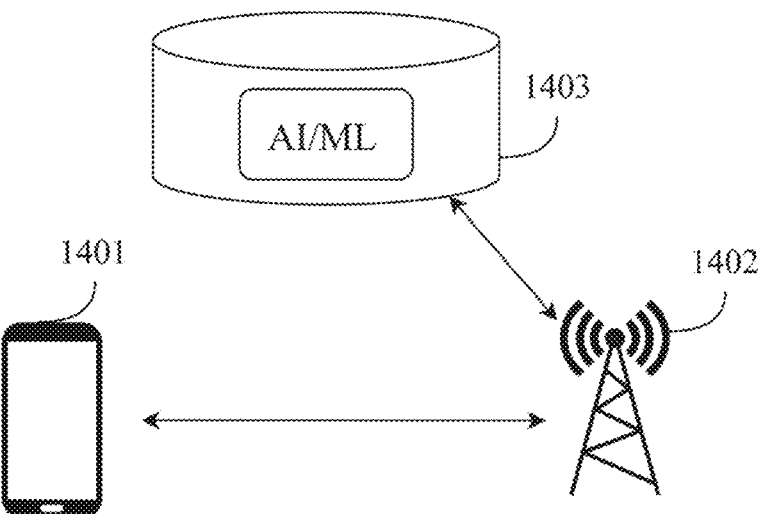
FIG. 14 exemplarily shows an illustration of a radio access network.

FIG. 14 exemplarily shows an illustration of a radio access network. A plurality of UEs including a UE 1401 may be connected to a BS 1402 over communication channels that are established between UEs and the BS 1402 including the communication channel that is established between the UE 1401 and the BS 1402 according to various aspects provided in this disclosure. In various examples, the BS 1402 may communicate with a further communication device 1403 that implements the AI/ML (e.g. an RIC) configured to determine, for a communication resource, a score representing a likelihood to be scheduled or allocated to use the communication resource for each UE. The BS 1402 may receive the channel information and the device information from UEs including the UE 1401 and obtain the input data as provided herein. The BS 1402 may then provide the input data to the further communication device 1403 that implements the AI/ML. The BS 1402 may then receive attention scores for each UE, or information indicating UEs to be scheduled or allocated to use the communication resource from the further communication device 1403 that implements the AI/ML and provide an output to schedule the communication resource (e.g. scheduling downlink transmissions, allocating uplink resources) to the UEs based on the attention scores.

FIG. 15 shows an example of a method. The method may include providing 1501 input data that is based on channel information indicating attributes associated with one or more established communication channels of a plurality of communication devices to a trained machine learning model configured to determine a score for each of the plurality of communication devices based on the input data, wherein the score for each of the plurality of communication devices indicates a likelihood of the respective communication device to be scheduled for a communication resource to perform a communication, determining 1502, for the communication resource, one or more communication devices from the plurality of communication devices based on the determined score for each of the plurality of communication devices, and providing 1503 an output to schedule the communication resource for the one or more communication devices.

The following examples pertain to further aspects of this disclosure.

In example 1, the subject matter includes a device including: a processor configured to: provide input data that is based on channel information representing, or indicating, attributes associated with one or more established communication channels of a plurality of communication devices to a trained machine learning model configured to determine a score for each of the plurality of communication devices based on the input data, can optionally include that the score indicates a likelihood of the respective communication device to be scheduled for a communication resource to perform a communication; determine, for the communication resource, one or more communication devices from the plurality of communication devices based on the determined score for each of the plurality of communication devices; provide an output to schedule the communication resource for the one or more communication devices. The device may further include a memory to store the channel information.

In example 2, the subject matter of example 1, can optionally include that the one or more communication channels are established between a respective communication device of the plurality of communication devices and a base station or another communication device. In example 3, the subject matter of any one of examples 1 or 2, can optionally include that the one or more communication devices include at least two communication devices. In example 4, the subject matter of any one of examples 1 to 3 can optionally include that the processor is further configured to determine, for the communication resource, the one or more communication devices from the plurality of communication devices based on a threshold applied to the determined scores. In example 5, the subject matter of any one of examples 1 to 4, can optionally include that the channel information includes information representing, or indicating, for a communication channel, at least one of a channel quality indicator (CQI), a rank indicator, a correlation matrix, a precoding matrix indicator (PMI), a precoding matrix, information representing, or indicating, beamforming weights, signal interference to noise ratio (SINR) per subband, SINR per a multiple input multiple output (MIMO) layer, SINR associated with a transport block, and/or information associated with measurements performed by the device for the communication channel.

In example 6, the subject matter of example 5, can optionally include that the channel information includes the information for each sub-band of a plurality of sub-bands. In example 7, the subject matter of any one of examples 1 to 6, can optionally include that the input data is further based on device information indicative of at least one of predefined communication device priorities for at least some of the plurality of communication devices, predetermined maximum transmit power of the plurality of communication devices, predetermined average data rate of the plurality of communication devices, and/or predetermined buffer status indicative of data scheduled for communication in one or more buffers of the plurality of communication devices. In example 8, the subject matter of any one of examples 1 to 7, can optionally include that the trained machine learning model is configured to determine the score for the each of the plurality of communication devices based on a parameter, can optionally include that the parameter indicates the effect of at least one other communication device of the plurality of communication device to the one or more established communication channels of the respective communication device.

In example 9, the subject matter of example 8, can optionally include that the parameter is indicative of at least one of cross-interference between the plurality of communication devices, user fairness based on a priority defined for at least some of the plurality of communication devices, or sub-band association of the plurality of communication devices representing, or indicating, the likelihood of the respective communication device to be scheduled for a sub-band. In example 10, the subject matter of any one of examples 1 to 9, can optionally include that the trained machine learning model is configured to determine the score for the each of the plurality of communication devices for the communication resource.

In example 11, the subject matter of any one of examples 1 to 10, can optionally include that the trained machine learning model includes a graph neural network (GNN) configured to obtain a graph associated with the input data to determine the score for the each of the plurality of communication devices; can optionally include that the graph includes vertices for each MIMO layer of the plurality of communication devices; can optionally include that the graph further includes one or more edges between the vertices, can optionally include that each edge is associated with at least two model weight parameters. In example 12, the subject matter of example 11, can optionally include that the GNN includes a multi-head graph attention network (MH-GAT); can optionally include that the MH-GAT is configured to determine the score based on at least two sets of model weight parameters; can optionally include that each set of model weight parameters are associated with a predefined attention criteria; can optionally include that the predefined attention criteria include at least one of cross-interference between the plurality of communication devices, user fairness based on a priority defined for at least some of the plurality of communication devices, or sub-band association of the plurality of communication devices representing, or indicating, the likelihood of the respective communication device to be scheduled for a sub-band.

In example 13, the subject matter of any one of examples 11 or 12, can optionally include that the trained machine learning model includes one or more GNN layers, for each sub-band, can optionally include that the one or more GNN layers for each sub-band is configured to receive sub-band input data including a portion of the input data associated with the respective sub-band and provide an output representing, or indicating, a likelihood of the each of the communication device to be scheduled for the respective sub-band. In example 14, the subject matter of example 13, can optionally include that the sub-band input data includes input feature vectors based on the channel information for the respective sub-band. In example 15, the subject matter of example 13 or example 14, can optionally include that the provided output for each sub-band includes attention scores associated with each MIMO layer of the plurality of communication devices for the respective sub-band; can optionally include that the attention scores associated for all MIMO layers of each of the plurality of communication devices are the same. In example 16, the subject matter of any one of examples 13 to 15, can optionally include that the determined scores for each of the plurality of communication devices associated with each sub-band belonging to the same resource block group (RBG) are the same.

In example 17, the subject matter of any one of examples 11 to 16, can optionally include that the sub-band input data for a sub-band includes an input feature vector based on a channel rank, an SINR measurement of MIMO layer, a transport block SINR, and a priority parameter for each of the plurality of communication devices. In example 18, the subject matter of any one of examples 11 to 17, can optionally include that the sub-band input data further includes input feature vectors based on the device information indicative of at least one of predefined communication device priorities for at least some of the plurality of communication devices, predetermined maximum transmit power of the plurality of communication devices, predetermined average data rate of the plurality of communication devices, predetermined buffer status indicative of data scheduled for communication in one or more buffers of the plurality of communication devices.

In example 19, the subject matter of any one of examples 11 to 18, can optionally include that the graph includes vertices, can optionally include that each vertex is defined based on a single MIMO layer and a single subband associated with the one or more established communication channels of each of the plurality of communication devices. In example 20, the subject matter of example 19, can optionally include that the graph includes a sub-band vertex representing the respective sub-band of the communication resource to be scheduled. In example 21, the subject matter of example 19 or 20, can optionally include that the plurality of edge weights includes a first set of edge weights based on user fairness representing, or indicating, predefined priorities for at least some of the plurality of communication devices, a second set of edge weights based on cross-interference, and a third set of edge weights based on user selection score representing, or indicating, the likelihood of the respective communication device to be scheduled for a sub-band. In example 22, the subject matter of example 21, can optionally include that the first set of edge weights includes machine learning model parameters for user fairness and a fairness adjacency matrix that is weighed based on information representing, or indicating, a priority of each of the plurality of communication devices.

In example 23, the subject matter of example 22, can optionally include that the processor is further configured to obtain the fairness adjacency matrix based on the input data. In example 24, the subject matter of any one of examples 21 to 23, can optionally include that the second set of edge weights includes machine learning model parameters for cross-interference and an interference adjacency matrix that is weighed based on information representing, or indicating, interference between the plurality of communication devices. In example 25, the subject matter of example 24, can optionally include that the processor is further configured to obtain the interference adjacency matrix based on the input data. In example 26, the subject matter of any one of examples 21 to 25, can optionally include that the third set of edge weights includes machine learning model parameters for user selection score and a score adjacency matrix that is weighed with a score parameter that is based on hidden features of each vertex associated with the respective communication device for the each of the plurality of communication devices. In example 27, the subject matter of example 26, can optionally include that the processor is further configured to obtain the score adjacency matrix based on the input data and machine learning model parameters for attention calculation. In example 28, the subject matter of any one of examples 26 or 27, can optionally include that the determined score for each of the plurality of communication devices is based on the score parameter that is calculated by the last layer of the one or more GNN layers.

In example 29, the subject matter of any one of examples 26 to 28, can optionally include that. wherein the one or more GNN layers includes an L-layer diffusion convolutional GNN configured to provide output $$X_s^l$$

according to an equation $$X_s^l = A_s^l F_s^l W_a^l + C_s F_s^l W_c^l + Q_s F_s^l W_q^l$$

wherein $$F_s^{l+1}$$

includes an output of an activation function with an input $$X_s^l;$$

wherein s is a sub-band index, l is a layer index, A includes the score adjacency matrix, F includes the input feature vector, $W_a$ includes the machine learning model parameters for user selection score, C includes the interference adjacency matrix, $W_c$ includes the machine learning model parameters for cross-interference, Q includes the information indicating the priority, $W_c$ includes the machine learning model parameters for user fairness, and F includes concatenation of input feature vectors and a feature vector defined for the sub-band.

In example 30, the subject matter of any one of examples 1 to 29, can optionally include that the processor is further configured to provide output representing, or indicating, a rate allocation and/or a modulation coding scheme (MCS) selection. In example 31, the subject matter of example 30, can optionally include that the processor is further configured to provide the output representing, or indicating, the rate allocation and/or the MCS selection based on the determined score of the one or more communication devices. In example 32, the subject matter of any one of examples 1 to 31, further including: a transceiver configured to communicate with the one or more communication devices according to the scheduled communication resource.

In example 33, the subject matter of any one of examples 1 to 32, can optionally include that the processor is configured to implement the trained machine learning model at a medium access control (MAC) layer according to an open systems interconnection (OSI) model. In example 34, the subject matter of any one of examples 2 to 33, can optionally include that the device is the base station. In example 35, the subject matter of any one of examples 2 to 34, can optionally include that the device is a control unit (CU), or a distributed unit (DU) communicatively coupled to the base station, can optionally include that the base station includes a radio unit (RU).

In example 36, the subject matter of any one of examples 1 to 35, can optionally include that the input data includes a graph, and can optionally include that the graph includes vertices for each MIMO layer of the plurality of communication devices and a communication resource vertex for the communication resource to be scheduled; can optionally include that the graph further includes one or more edges between the vertices, can optionally include that each edge is associated with at least two model weight parameters. In example 37, the subject matter of example 36, wherein the input data includes a plurality of graphs for a plurality of sub-bands, and each graph includes vertices for each MIMO layer of the plurality of communication devices based on the channel information and the device information for a respective sub-band, and a sub-band vertex for the respective sub-band. In example 38, the subject matter of examples 36 or 37, wherein each graph further includes a vertex for the respective sub-band. In example 39, the device of any one of examples 1 to 38, can optionally include that the determined score for each of the plurality of communication devices includes an attention score obtained by an attention mechanism.

In example 40, the subject matter includes a method including: providing input data that is based on channel information representing, or indicating, attributes associated with one or more established communication channels of a plurality of communication devices to a trained machine learning model configured to determine a score for each of the plurality of communication devices based on the input data, can optionally include that the score for each of the plurality of communication devices indicates a likelihood of the respective communication device to be scheduled for a communication resource to perform a communication; determining, for the communication resource, one or more communication devices from the plurality of communication devices based on the determined score for each of the plurality of communication devices; providing an output to schedule the communication resource for the one or more communication devices.

In example 41, the subject matter of example 40, can optionally include that the one or more communication channels are established between a respective communication device of the plurality of communication devices and a base station or another communication device. In example 42, the subject matter of any one of examples 40 or 41, can optionally include that the one or more communication devices include at least two communication devices. In example 43, the subject matter of any one of examples 40 to 42, further including: determining, for the communication resource, the one or more communication devices from the plurality of communication devices based on a threshold applied to the determined scores. In example 44, the subject matter of any one of examples 40 to 43, can optionally include that the channel information includes information representing, or indicating, for a communication channel, at least one of a channel quality indicator (CQI), a rank indicator, a correlation matrix, a precoding matrix indicator (PMI), a precoding matrix, information representing, or indicating, beamforming weights, signal interference to noise ratio (SINR) per subband, SINR per a multiple input multiple output (MIMO) layer, SINR associated with a transport block, and/or information associated with measurements performed by the device for the communication channel.

In example 45, the subject matter of example 44, can optionally include that the channel information includes the information for each sub-band of a plurality of sub-bands. In example 46, the subject matter of any one of examples 41 to 45, can optionally include that the input data is further based on device information indicative of at least one of predefined communication device priorities for at least some of the plurality of communication devices, predetermined maximum transmit power of the plurality of communication devices, predetermined average data rate of the plurality of communication devices, and/or predetermined buffer status indicative of data scheduled for communication in one or more buffers of the plurality of communication devices. In example 47, the subject matter of any one of examples 40 to 46, determining the score for the each of the plurality of communication devices based on a parameter with the trained machine learning model, can optionally include that the parameter represents the effect of at least one other communication device of the plurality of communication device to the one or more established communication channels of the respective communication device.

In example 48, the subject matter of example 47, can optionally include that the parameter is indicative of at least one of cross-interference between the plurality of communication devices, user fairness based on a priority defined for at least some of the plurality of communication devices, or sub-band association of the plurality of communication devices representing, or indicating, the likelihood of the respective communication device to be scheduled for a sub-band. In example 49, the subject matter of any one of examples 40 to 48, determining, by the trained machine learning model, the score for the each of the plurality of communication devices for the communication resource. In example 50, the subject matter of any one of examples 40 to 49, can optionally include that the trained machine learning model includes a graph neural network (GNN) configured to obtain a graph associated with the input data to determine the score for the each of the plurality of communication devices; can optionally include that the graph includes vertices for each MIMO layer of the plurality of communication devices; can optionally include that the graph further includes one or more edges between the vertices, can optionally include that each edge is associated with at least two model weight parameters.

In example 51, the subject matter of example 50, can optionally include that the GNN includes a multi-head graph attention network (MH-GAT); the method further includes determining the score based on at least two sets of model weight parameters; can optionally include that each set of model weight parameters are associated with a predefined attention criteria; can optionally include that the predefined attention criteria include at least one of cross-interference between the plurality of communication devices, user fairness based on a priority defined for at least some of the plurality of communication devices, or sub-band association of the plurality of communication devices representing, or indicating, the likelihood of the respective communication device to be scheduled for a sub-band. In example 52, the subject matter of any one of examples 50 or 51, can optionally include that the trained machine learning model includes one or more GNN layers, for each sub-band; can optionally include that the method further including receiving, by the one or more GNN layers for each sub-band, sub-band input data including a portion of the input data associated with the respective sub-band and providing an output representing, or indicating, a likelihood of the each of the communication device to be scheduled for the respective sub-band.

In example 53, the subject matter of example 52, can optionally include that the sub-band input data includes input feature vectors based on the channel information for the respective sub-band. In example 54, the subject matter of example 52 or example 53, can optionally include that the provided output for each sub-band includes attention scores associated with each MIMO layer of the plurality of communication devices for the respective sub-band; can optionally include that the attention scores associated for all MIMO layers of each of the plurality of communication devices are the same. In example 55, the subject matter of any one of examples 51 to 54, can optionally include that the determined scores for each of the plurality of communication devices associated with each sub-band belonging to the same resource block group (RBG) are the same. In example 56, the subject matter of any one of examples 51 to 55, can optionally include that the sub-band input data for a sub-band includes an input feature vector based on a channel rank, an SINR measurement of MIMO layer, a transport block SINR, and a priority parameter for each of the plurality of communication devices. In example 57, the subject matter of any one of examples 50 to 56, can optionally include that the sub-band input data further includes input feature vectors based on the device information indicative of at least one of predefined communication device priorities for at least some of the plurality of communication devices, predetermined maximum transmit power of the plurality of communication devices, predetermined average data rate of the plurality of communication devices, predetermined buffer status indicative of data scheduled for communication in one or more buffers of the plurality of communication devices.

In example 58, the subject matter of any one of examples 50 to 57, can optionally include that the graph includes vertices, can optionally include that each vertex is defined based on a single MIMO layer and a single subband associated with the one or more established communication channels of each of the plurality of communication devices. In example 59, the subject matter of example 58, can optionally include that the graph includes a sub-band vertex representing the respective sub-band of the communication resource to be scheduled. In example 60, the subject matter of example 58 or 59, can optionally include that the plurality of edge weights includes a first set of edge weights based on user fairness representing, or indicating, predefined priorities for at least some of the plurality of communication devices, a second set of edge weights based on cross-interference, and a third set of edge weights based on user selection score representing, or indicating, the likelihood of the respective communication device to be scheduled for a sub-band. In example 61, the subject matter of example 60, can optionally include that the first set of edge weights includes machine learning model parameters for user fairness and a fairness adjacency matrix that is weighed based on information representing, or indicating, a priority of each of the plurality of communication devices.

In example 62, the subject matter of example 61, further including: obtaining the fairness adjacency matrix based on the input data. In example 63, the subject matter of any one of examples 60 to 62, can optionally include that the second set of edge weights includes machine learning model parameters for cross-interference and an interference adjacency matrix that is weighed based on information representing, or indicating, interference between the plurality of communication devices. In example 64, the subject matter of example 24, further including: obtaining the interference adjacency matrix based on the input data. In example 65, the subject matter of any one of examples 60 to 64, can optionally include that the third set of edge weights includes machine learning model parameters for user selection score and a score adjacency matrix that is weighed with a score parameter that is based on hidden features of each vertex associated with the respective communication device for the each of the plurality of communication devices. In example 66, the subject matter of example 62, further including: obtaining the score adjacency matrix based on the input data and machine learning model parameters for attention calculation. In example 67, the subject matter of any one of examples 65 or 66, can optionally include that the determined score for each of the plurality of communication devices is based on the score parameter that is calculated by the last layer of the one or more GNN layers.

In example 68, the subject matter of any one of examples 65 to 67, wherein the one or more GNN layers includes an L-layer diffusion convolutional GNN providing output $$X_s^l$$

according to an equation $$X_s^l = A_s^l F_s^l W_a^l + C_s F_s^l W_c^l + Q_s F_s^l W_q^l$$

wherein $$F_s^{l+1}$$

includes an output of an activation function with an input $$X_s^l;$$

wherein s is a sub-band index, l is a layer index, A includes the score adjacency matrix, F includes the input feature vector, $W_a$ includes the machine learning model parameters for user selection score, C includes the interference adjacency matrix, $W_c$ includes the machine learning model parameters for cross-interference, Q includes the information indicating the priority, $W_c$ includes the machine learning model parameters for user fairness, and F includes concatenation of input feature vectors and a feature vector defined for the sub-band.

In example 69, the subject matter of any one of examples 40 to 68, further including: providing output representing, or indicating, a rate allocation and/or a modulation coding scheme (MCS) selection. In example 70, the subject matter of example 69, further including: providing the output representing, or indicating, the rate allocation and/or the MCS selection based on the determined score of the one or more communication devices. In example 71, the subject matter of any one of examples 40 to 70, further including: communicating with the one or more communication devices according to the scheduled communication resource. In example 72, the subject matter of any one of examples 40 to 71, further including: implementing the trained machine learning model at a medium access control (MAC) layer according to an open systems interconnection (OSI) model. In example 73, the subject matter of any one of examples 40 to 72, can optionally include that the method is performed by the base station. In example 74, the subject matter of any one of examples 40 to 73, can optionally include that the method is performed by a control unit (CU), or a distributed unit (DU) communicatively coupled to the base station, can optionally include that the base station includes a radio unit (RU).

In example 75, the subject matter of any one of examples 40 to 74, can optionally include that the input data includes a graph, and can optionally include that the graph includes vertices for each MIMO layer of the plurality of communication devices and a communication resource vertex for the communication resource to be scheduled; can optionally include that the graph further includes one or more edges between the vertices, can optionally include that each edge is associated with at least two model weight parameters. In example 76, the subject matter of example 75, wherein the input data includes a plurality of graphs for a plurality of sub-bands, and each graph includes vertices for each MIMO layer of the plurality of communication devices based on the channel information and the device information for a respective sub-band, and a sub-band vertex for the respective sub-band. In example 77, the subject matter of examples 40 or 76, wherein each graph further includes a vertex for the respective sub-band.

In example 78, the subject matter includes a device that may include a processor configured to: obtain input data based on channel information associated with one or more established communication channels of a plurality of communication devices; determine a score for each of the plurality of communication devices based on the input data using a machine learning model, can optionally include that the determined score indicates a performance metric for the respective communication device to perform a communication using a communication resource to be scheduled; select, for the communication resource, one or more communication devices from the plurality of communication devices based on the determined score for each of the plurality of communication devices; provide an output to schedule the communication resource for the one or more communication devices. The device may further include a memory to store the channel information in example, 79, the subject matter of example 78 is further configured to operate as provided in examples 1 to 39.

In example 80, the subject matter includes a non-transitory computer-readable medium including one or more instructions which, if executed by a processor, cause the processor to: provide input data that is based on channel information representing, or indicating, attributes associated with one or more established communication channels of a plurality of communication devices to a trained machine learning model configured to determine a score for each of the plurality of communication devices based on the input data, can optionally include that the score for each of the plurality of communication devices indicates a likelihood of the respective communication device to be scheduled for a communication resource to perform a communication; determine, for the communication resource, one or more communication devices from the plurality of communication devices based on the determined score for each of the plurality of communication devices; provide an output to schedule the communication resource for the one or more communication devices. In example 81, the subject matter of example 80 includes one or more instructions to cause the processor to perform operations as provided in examples 1 to 39, or cause the processor to perform any of the methods as provided in examples 40 to 77.

In example 82, the subject matter includes a device that may include: means for providing input data that is based on channel information representing, or indicating, attributes associated with one or more established communication channels of a plurality of communication devices to a trained machine learning model configured to determine a score for each of the plurality of communication devices based on the input data, can optionally include that the score for each of the plurality of communication devices indicates a likelihood of the respective communication device to be scheduled for a communication resource to perform a communication; means for determining, for the communication resource, one or more communication devices from the plurality of communication devices based on the determined score for each of the plurality of communication devices; means for providing an output to schedule the communication resource for the one or more communication devices. In example, 83, the subject matter of example 82 further includes means to operate as provided in examples 1 to 39.

Throughout the drawings, it should be noted that like reference numbers are used to depict the same or similar elements, features, and structures, unless otherwise noted. It should be noted that certain components may be omitted for the sake of simplicity. It should be noted that nodes (dots) are provided to identify the circuit line intersections in the drawings including electronic circuit diagrams.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

As used herein, a signal that is "indicative of" or "indicating" a value or other information may be a digital or analog signal that encodes or otherwise, communicates the value or other information in a manner that can be decoded by and/or cause a responsive action in a component receiving the signal. The signal may be stored or buffered in computer-readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or 9. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The terms "one or more processors" is intended to refer to a processor or a controller. The one or more processors may include one processor or a plurality of processors. The terms are simply used as an alternative to the "processor" or "controller".

The term "user device" is intended to refer to a device of a user (e.g. occupant) that may be configured to provide information related to the user. The user device may exemplarily include a mobile phone, a smart phone, a wearable device (e.g. smart watch, smart wristband), a computer, etc.

As utilized herein, terms "module", "component," "system," "circuit," "element," "slice," "circuit," and the like are intended to refer to a set of one or more electronic components, a computer-related entity, hardware, software (e.g., in execution), and/or firmware. For example, circuit or a similar term can be a processor, a process running on a processor, a controller, an object, an executable program, a storage device, and/or a computer with a processing device. By way of illustration, an application running on a server and the server can also be circuit. One or more circuits can reside within the same circuit, and circuit can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art. The term "data item" may include data or a portion of data.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "provided" to an element, the voltage, current, or signal may be conducted to the element by way of a physical connection or by way of capacitive, electro-magnetic, or inductive coupling that does not involve a physical connection.

Unless explicitly specified, the term "instance of time" refers to a time of a particular event or situation according to the context. The instance of time may refer to an instantaneous point in time, or to a period of time which the particular event or situation relates to.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers.

The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth (BT), Global Positioning System (GPS), Wi-Fi, Wi-Max, Zig-Bee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN, and the like.

Some aspects may be used in conjunction with a wireless communication network communicating over a frequency band of 2.4 GHz, 5 GHz, and/or 6-7 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A device comprising:

a memory; and a processor configured to:

provide a graph as input data, the graph being based on channel information representative of attributes associated with one or more established communication channels of a plurality of communication devices, to a trained machine learning model configured to determine a score for each of the plurality of communication devices based on the input data, wherein the graph comprises a plurality of vertices comprising multiple input multiple output (MIMO) layer vertices, wherein each MIMO layer vertex is associated with a MIMO layer of one of the plurality of communication devices, and a communication resource vertex associated with the communication resource, wherein the graph comprises a plurality of edge sets between vertices, each edge set represent a relation associated to the vertices coupled by the edges, wherein the determined score is an attention score and represents a likelihood of the respective communication device to be scheduled for the communication resource to perform a communication;

obtain a cross-interference adjacency matrix representing a relation associated with the cross-interference between the communication devices, a user fairness adjacency matrix representing a relation associated with user fairness based on user fairness based on a priority defined for at least some of the plurality of communication devices, and an initial attention matrix representing an initial likelihood of the plurality of communication devices to be scheduled for the communication resource;

determine, for the communication resource, one or more communication devices from the plurality of communication devices based on the determined score for each of the plurality of communication devices;

provide an output to schedule the communication resource for the one or more communication devices.

2. The device of claim 1, wherein the one or more communication channels are established between a respective communication device of the plurality of communication devices and a base station or another communication device.

3. The device of claim 1, wherein the one or more communication devices comprise at least two communication devices.

4. The device of claim 1, wherein the processor is further configured to determine, for the communication resource, the one or more communication devices from the plurality of communication devices based on a threshold applied to the determined scores.

5. The device of claim 1, wherein the channel information comprises information representing, for a communication channel, at least one of a channel quality indicator (CQI), a rank indicator, a correlation matrix, a precoding matrix indicator (PMI), a precoding matrix, information representing beamforming weights, signal interference to noise ratio (SINR) per subband, SINR per a multiple input multiple output (MIMO) layer, SINR associated with a transport block, and/or information associated with measurements performed by the device for the communication channel.

6. The device of claim 5, wherein the channel information comprises the information for each sub-band of a plurality of sub-bands.

7. The device of claim 1, wherein the input data is further based on device information representative of at least one of predefined communication device priorities for at least some of the plurality of communication devices, predetermined maximum transmit power of the plurality of communication devices, predetermined average data rate of the plurality of communication devices, and/or predetermined buffer status representative of data scheduled for communication in one or more buffers of the plurality of communication devices.

8. The device of claim 1, wherein the trained machine learning model is configured to determine the determined score for the each of the plurality of communication devices based on a parameter, wherein the parameter represents the effect of at least one other communication device of the plurality of communication device to the one or more established communication channels of the respective communication device;

wherein the parameter is representative of at least one of cross-interference between the plurality of communication devices, user fairness based on a priority defined for at least some of the plurality of communication devices, or sub-band association of the plurality of communication devices representing the likelihood of the respective communication device to be scheduled for a sub-band.

9. The device of claim 1, wherein the plurality of edge sets comprising a first set of edge weights based on cross-interference, a second set of edge weights based on user fairness representing predefined priorities for at least some of the plurality of communication devices, and a third set of edge weights based on user selection score representing the likelihood of the respective communication device to be scheduled.

10. The device of claim 1, wherein the trained machine learning model comprises a graph neural network (GNN) configured to receive the input data;

wherein the attention score represents the importance of vertices associated with the respective communication device to the communication resource vertex based on an attention mechanism.

11. The device of claim 10, wherein the GNN comprises a multi-head graph attention network (MH-GAT);

wherein the MH-GAT is configured to determine the attention score based on the input data comprising a plurality of graphs for a plurality of sub-band graphs, each graph is obtained for a sub-band of the communication resource based on a portion of the channel information that is associated with the respective input and comprising a sub-band vertex as the communication resource vertex.

12. The device of claim 11, wherein the determined attention score for each communication device is based on the plurality of graphs obtained for all sub-bands of the communication resource.

13. The device of claim 10,
wherein the GNN comprises one or more of layers that are configured to receive input features and provide an output including the attention score, wherein the determined score comprises the attention score that is calculated by the last layer of the one or more GNN layers.

14. The device of claim 13,
wherein the one or more GNN layers comprises an L-layer diffusion convolutional GNN configured to provide output $$X_s^l$$

according to an equation $$X_s^l = A_s^l F_s^l W_a^l + C_s F_s^l W_c^l + Q_s F_s^l W_q^l$$

wherein $$F_s^{l+1}$$

comprises an output of an activation function with an input $$X_s^l;$$

wherein s is a sub-band index, 1 is a layer index, A comprises the score adjacency matrix, F comprises the input feature vector, $W_a$ comprises machine learning model parameters for user selection score, C comprises the interference adjacency matrix, $W_c$ comprises the machine learning model parameters for cross-interference, Q comprises the information representing the priority, $W_c$ comprises machine learning model parameters for user fairness, and F comprises concatenation of input feature vectors and a feature vector defined for the sub-band.

15. The device of claim 1,
wherein the processor is further configured to provide output representative of a rate allocation and/or a modulation coding scheme (MCS) selection.

16. The device of claim 1, further comprising:
a transceiver configured to communicate with the one or more communication devices according to the scheduled communication resource;
wherein the transceiver is configured to transmit radio communication signals to the one or more communication devices by using the communication resource.

17. The device of claim 1,
wherein the processor is configured to implement the trained machine learning model at a medium access control (MAC) layer according to an open systems interconnection (OSI) model.

18. A method comprising:
providing a graph as input data, the graph being based on channel information representative of attributes associated with one or more established communication channels of a plurality of communication devices, to a trained machine learning model, wherein the graph comprises a plurality of vertices comprising multiple input multiple output (MIMO) layer vertices, wherein each MIMO layer vertex is associated with a MIMO layer of one of the plurality of communication devices, and a communication resource vertex associated with the communication resource, wherein the graph comprises a plurality of edge sets between vertices, each edge set represent a relation associated to the vertices coupled by the edges;
obtaining a cross-interference adjacency matrix representing a relation associated with cross-interference between the communication devices, a user fairness adjacency matrix representing a relation associated with user fairness based on a priority defined for at least some of the plurality of communication devices, and an initial attention matrix representing an initial likelihood of the plurality of communication devices to be scheduled for the communication resource; wherein the trained machine learning module is configured to determine a score for each of the plurality of communication devices based on the input data, wherein the determined score for each of the plurality of communication devices is an attention score and represents a likelihood of the respective communication device to be scheduled for the communication resource to perform a communication;
determining, for the communication resource, one or more communication devices from the plurality of communication devices based on the determined score for each of the plurality of communication devices;
providing an output to schedule the communication resource for the one or more communication devices.

19. A non-transitory computer-readable medium comprising one or more instructions which, if executed by a processor, cause the processor to:
provide a graph as input data, the graph being based on channel information representative of attributes associated with one or more established communication channels of a plurality of communication devices to a trained machine learning model, wherein the graph comprises a plurality of vertices comprising multiple input multiple output (MIMO) layer vertices, wherein each MIMO layer vertex is associated with a MIMO layer of one of the plurality of communication devices, and a communication resource vertex associated with the communication resource, wherein the graph comprises a plurality of edge sets between vertices, each edge set represent a relation associated to the vertices coupled by the edges;
obtain a cross-interference adjacency matrix representing a relation associated with cross-interference between the communication devices, a user fairness adjacency matrix representing a relation associated with user fairness based on a priority defined for at least some of the plurality of communication devices, and an initial attention matrix representing an initial likelihood of the plurality of communication devices to be scheduled for the communication resource; wherein the trained machine learning module is configured to determine a score for each of the plurality of communication devices based on the input data, wherein the determined score for each of the plurality of communication devices is an attention score and represents a likelihood of the respective communication device to be scheduled for the communication resource to perform a communication;

determine, for the communication resource, one or more communication devices from the plurality of communication devices based on the determined score for each of the plurality of communication devices;

provide an output to schedule the communication resource for the one or more communication devices.

20. The non-transitory computer-readable medium of claim 19, wherein the one or more communication devices comprise at least two communication devices.

* * * * *